US012567437B2

(12) United States Patent　　　　(10) Patent No.:　US 12,567,437 B2
　　Kawabe　　　　　　　　　　　　　(45) Date of Patent:　　Mar. 3, 2026

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takayuki Kawabe, Sagamihara Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/033,238

(22) Filed: Jan. 21, 2025

(65) Prior Publication Data

US 2026/0031101 A1　　Jan. 29, 2026

(30) Foreign Application Priority Data

Jul. 24, 2024　(JP) ................................. 2024-118512

(51) Int. Cl.
　　*G11B 5/012*　　　(2006.01)
　　*G11B 5/024*　　　(2006.01)
　　*G11B 5/09*　　　(2006.01)
　　*G11B 19/04*　　　(2006.01)
(52) U.S. Cl.
　　CPC .............. *G11B 5/012* (2013.01); *G11B 5/024* (2013.01); *G11B 5/09* (2013.01); *G11B 19/041* (2013.01)
(58) Field of Classification Search
　　None
　　See application file for complete search history.

(56) References Cited

U.S. PATENT DOCUMENTS

| | | | |
|---|---|---|---|
| 7,251,098 B1 * | 7/2007 | Wang ........................ | G11B 5/09 |
| 7,369,343 B1 * | 5/2008 | Yeo ...................... | G11B 19/041 |
| 8,976,473 B1 * | 3/2015 | Park ................ | G11B 20/10009 |
| | | | 360/39 |
| 10,748,567 B1 | 8/2020 | Zaitsu et al. | |
| 10,910,013 B1 | 2/2021 | Kawabe et al. | |
| 2005/0046988 A1 * | 3/2005 | Suk ........................ | G11B 5/455 |
| 2014/0218820 A1 * | 8/2014 | Nagata ................. | G11B 5/3106 |
| | | | 360/75 |
| 2022/0101875 A1 * | 3/2022 | Harllee .................. | G11B 5/012 |
| 2023/0260540 A1 | 8/2023 | Maeto | |

FOREIGN PATENT DOCUMENTS

JP　　　2023-119547 A　　8/2023

OTHER PUBLICATIONS

U.S. Appl. No. 18/792,391, filed Aug. 1, 2024.

* cited by examiner

*Primary Examiner* — Peter Vincent Agustin
(74) *Attorney, Agent, or Firm* — Kim & Stewart LLP

(57)　　　　　　ABSTRACT

According to one embodiment, a magnetic disk device includes a first disk having a first data track and a second data track, a first write head, a write processing unit, an error correction unit, a correction limit prediction unit, and a determination unit. During a write period, the correction limit prediction unit calculates an excess amount, calculates a metric value by multiplying a first weight coefficient by the excess amount, updates a cumulative metric value, and generates first prediction information. The determination unit determines whether or not to allow the write processing unit to continue write processing for the second data track based on the first prediction information.

20 Claims, 17 Drawing Sheets

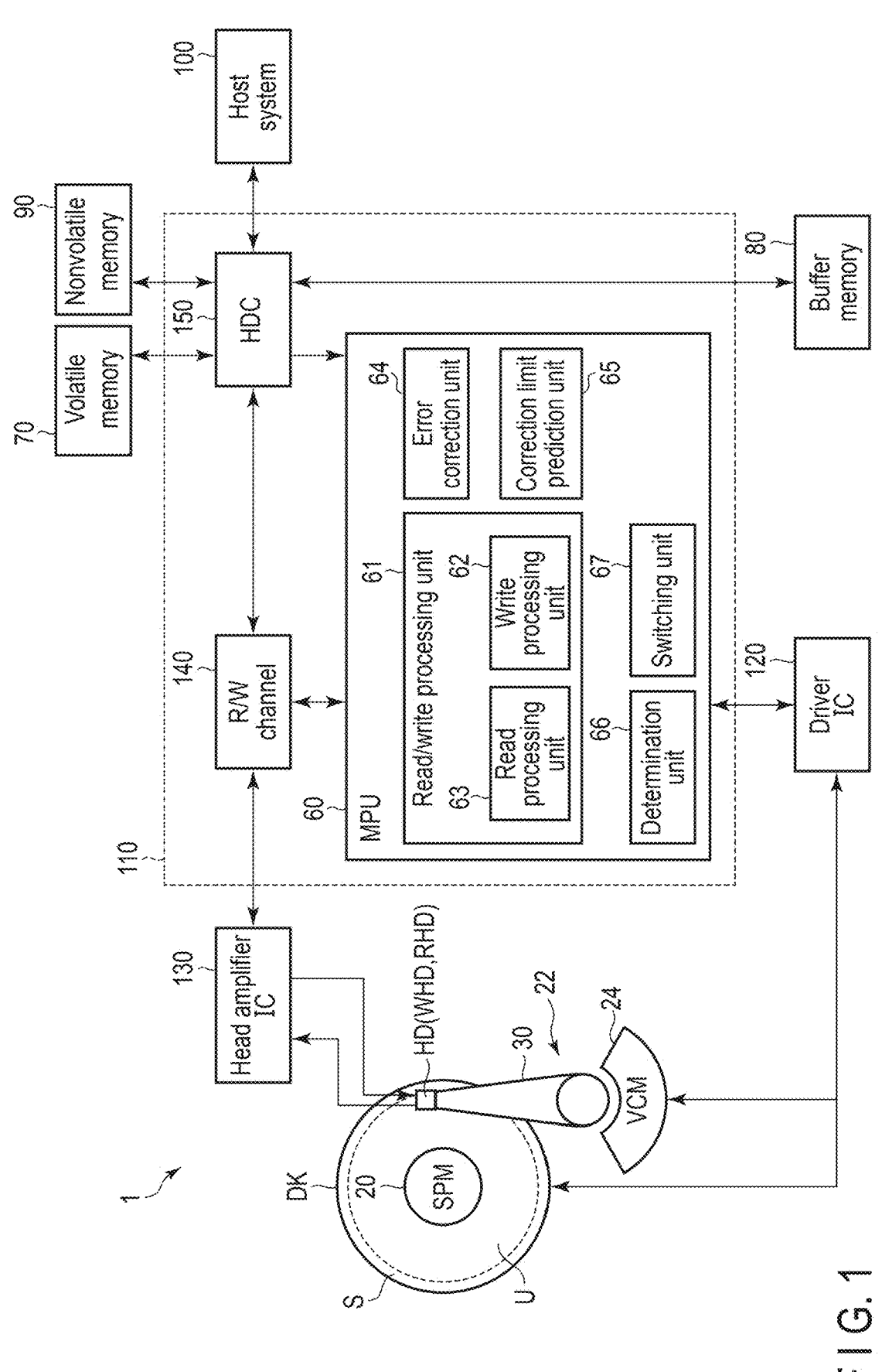
F I G. 1

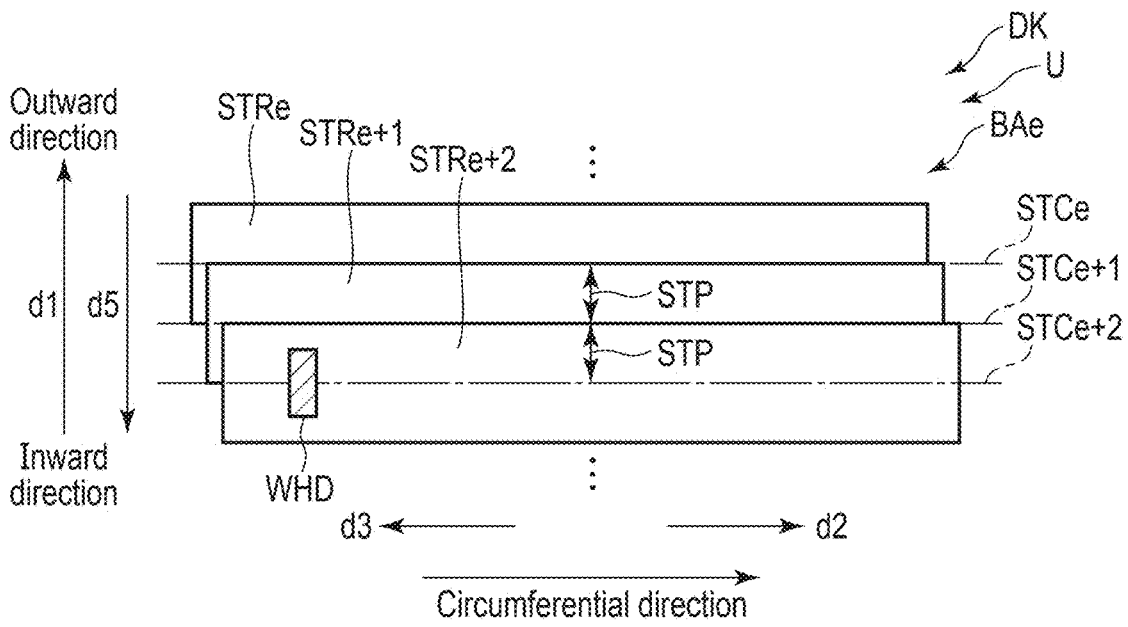
F I G. 4
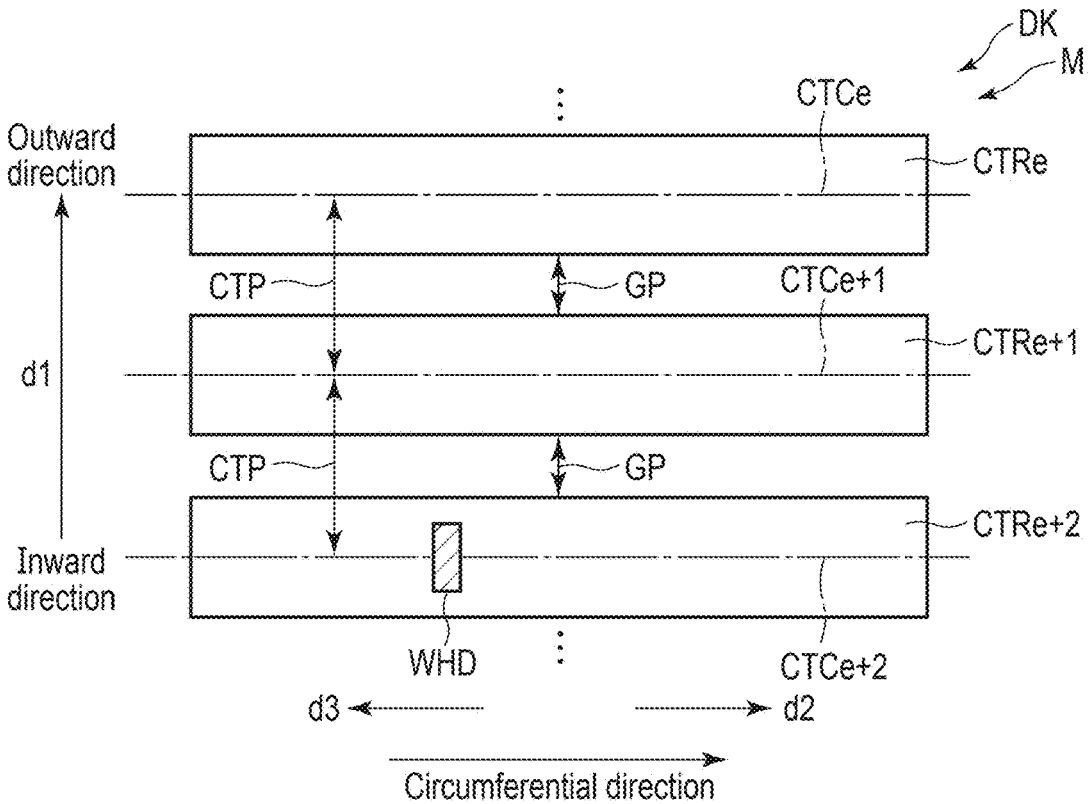
F I G. 5

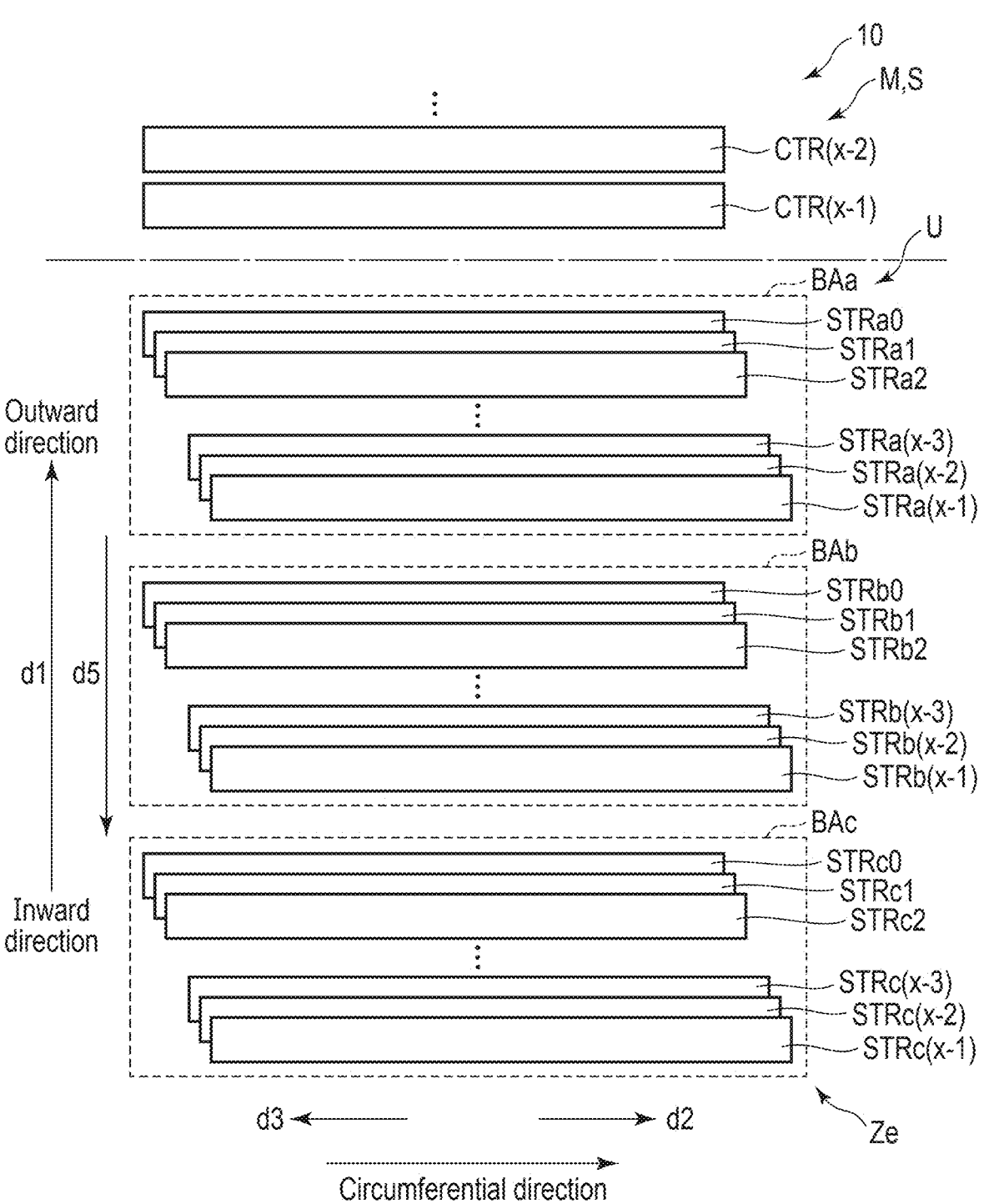
F I G. 6

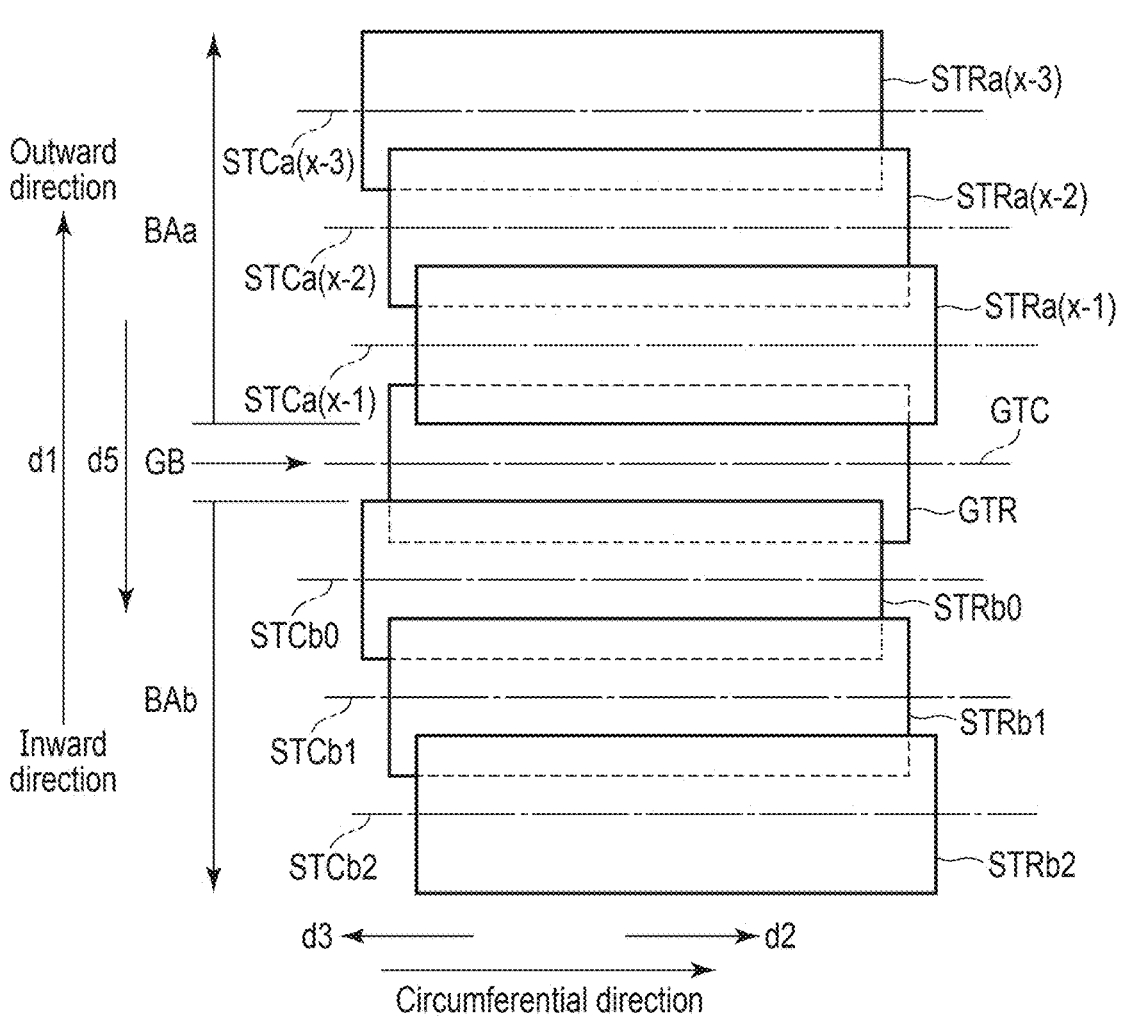
F I G. 7
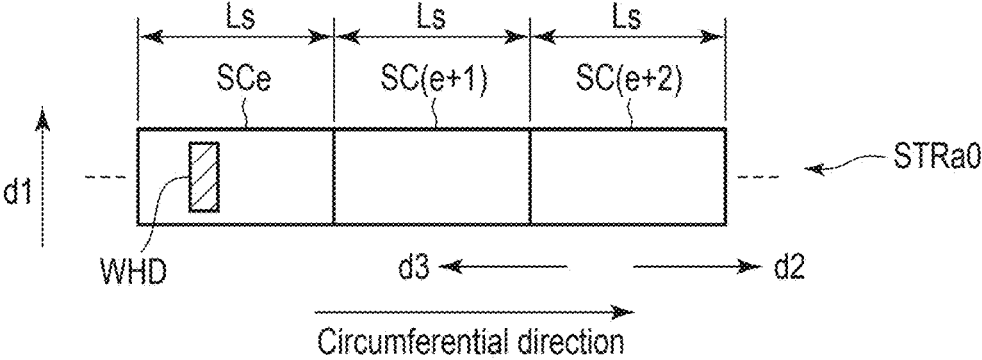
F I G. 8

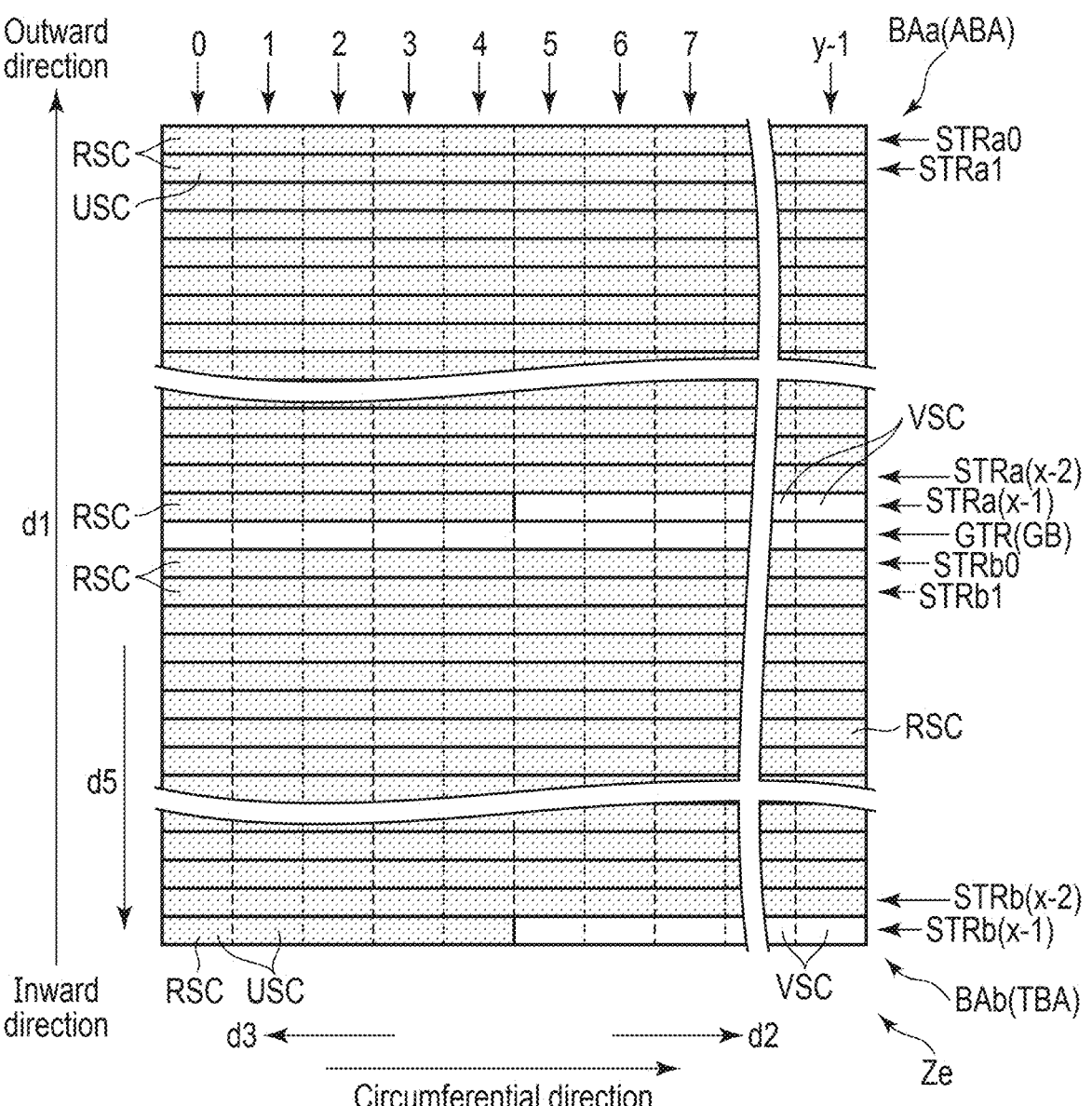
F I G. 9

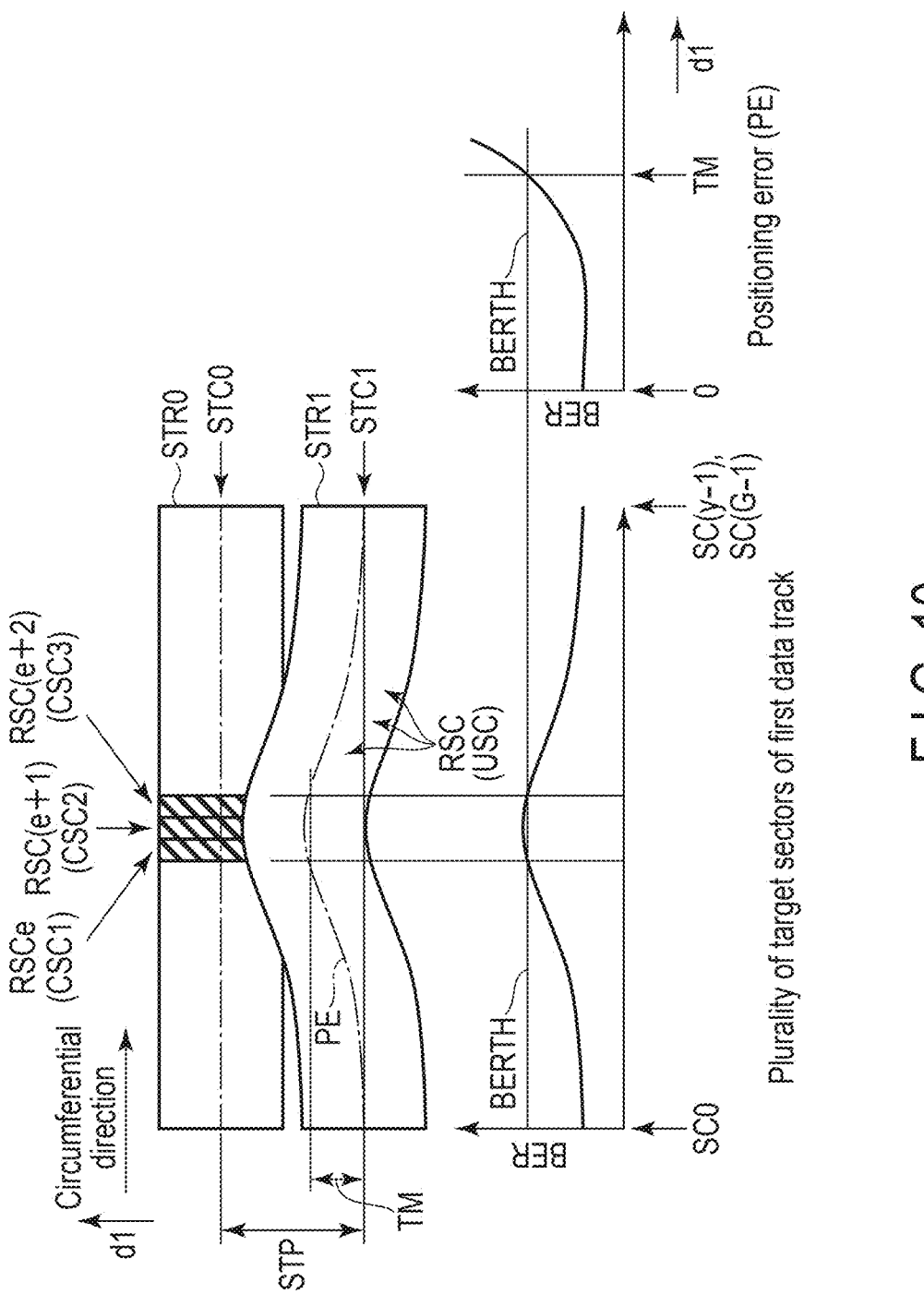
F I G. 10

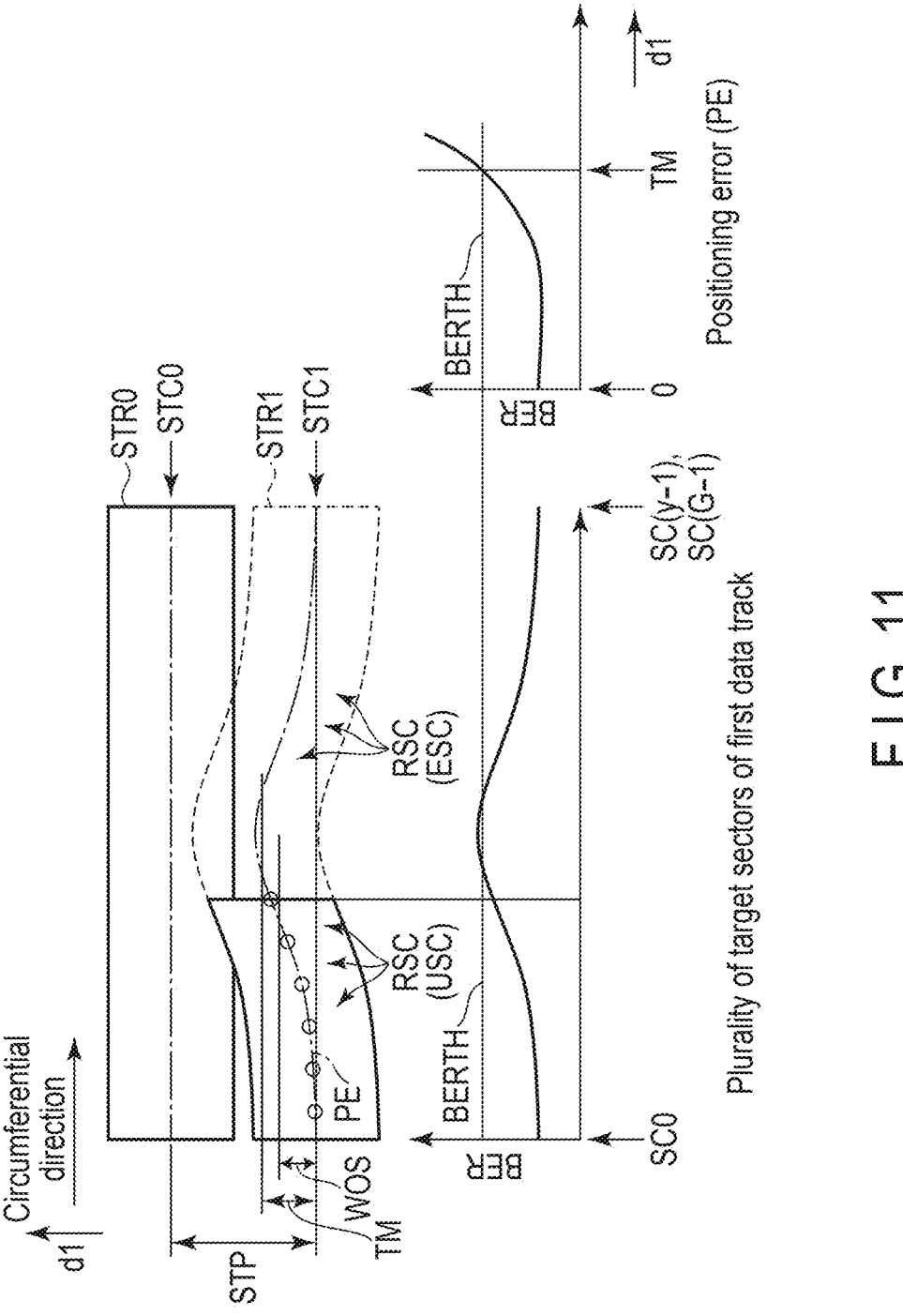
F I G. 11

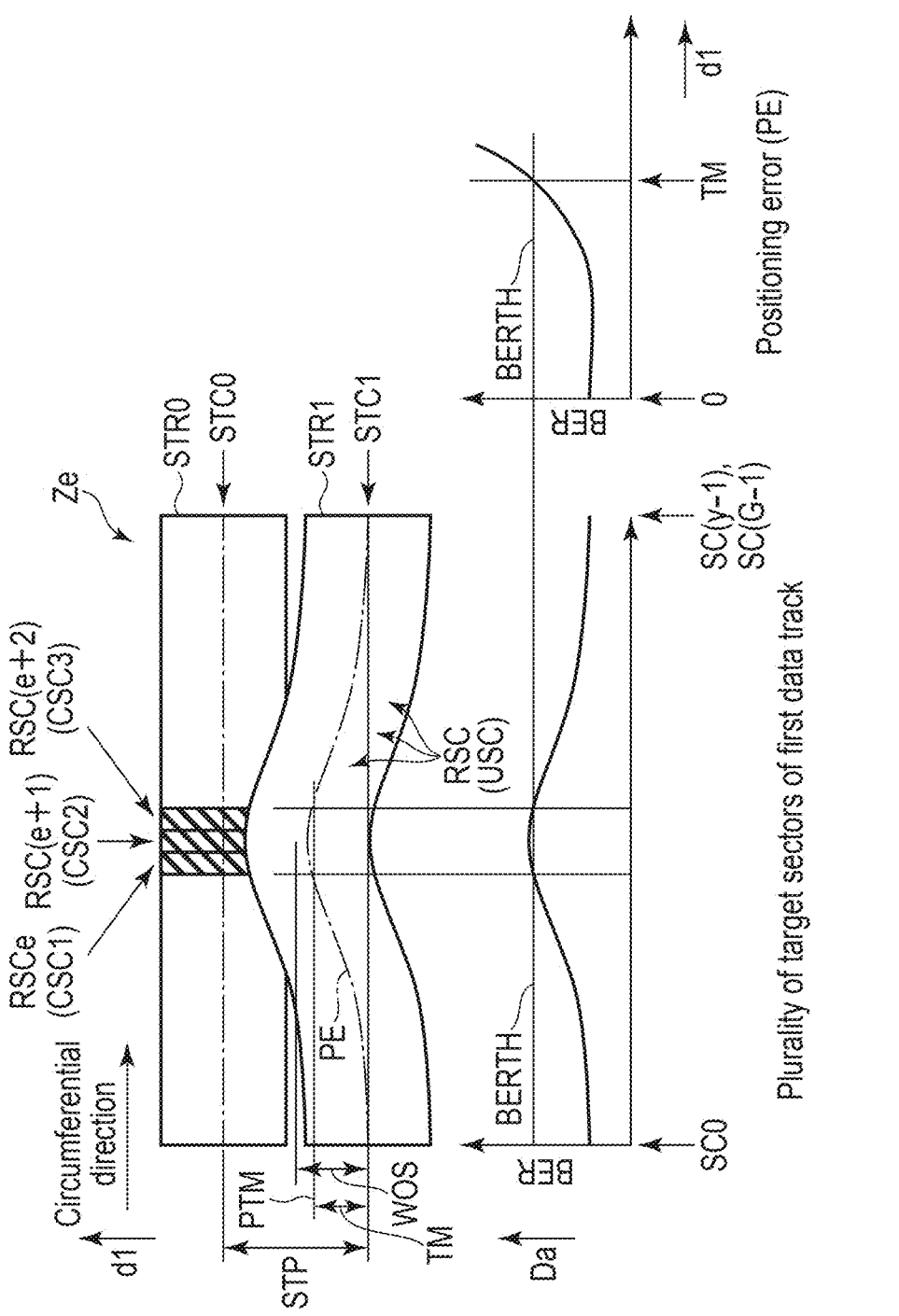
F I G. 12

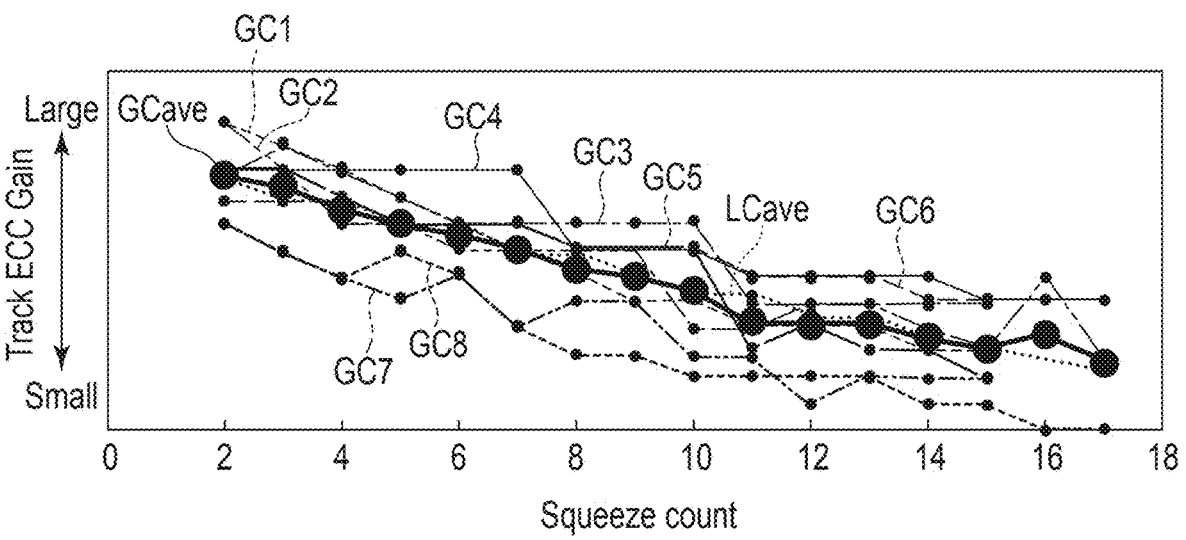
F I G. 13
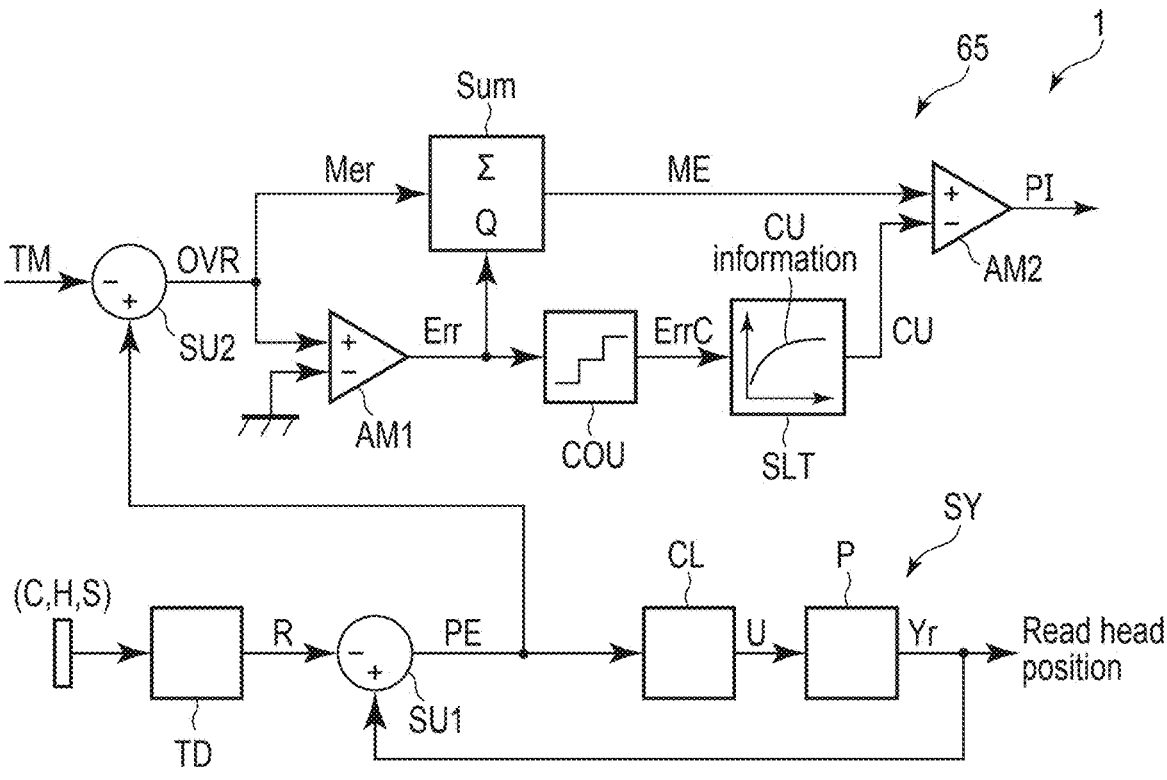
F I G. 14

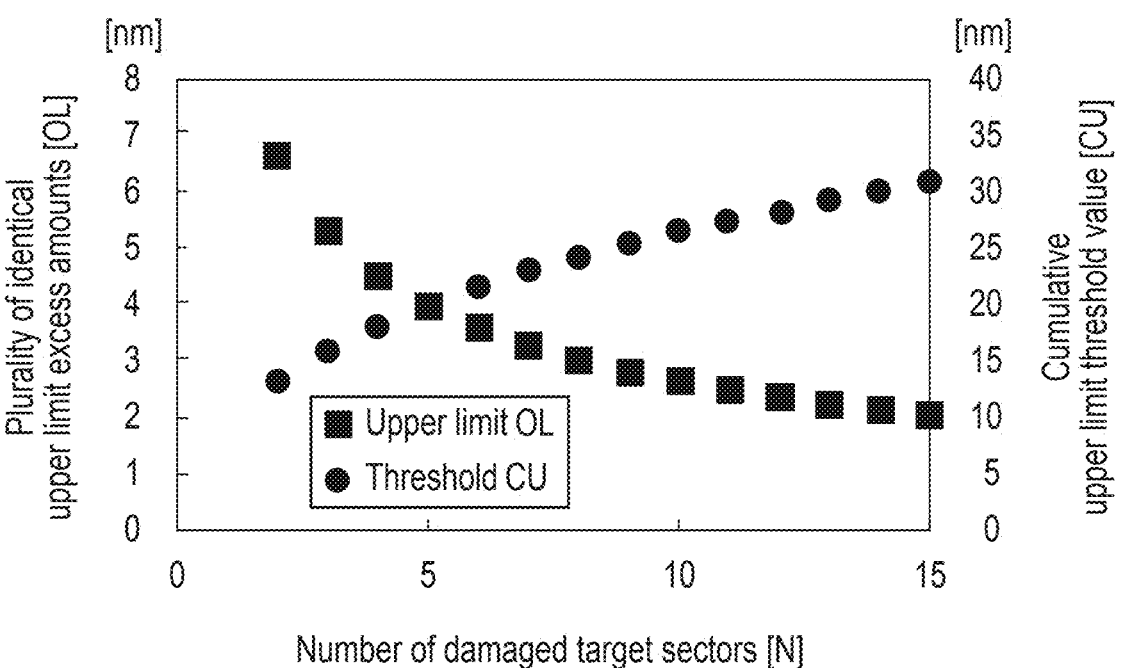
F I G. 15
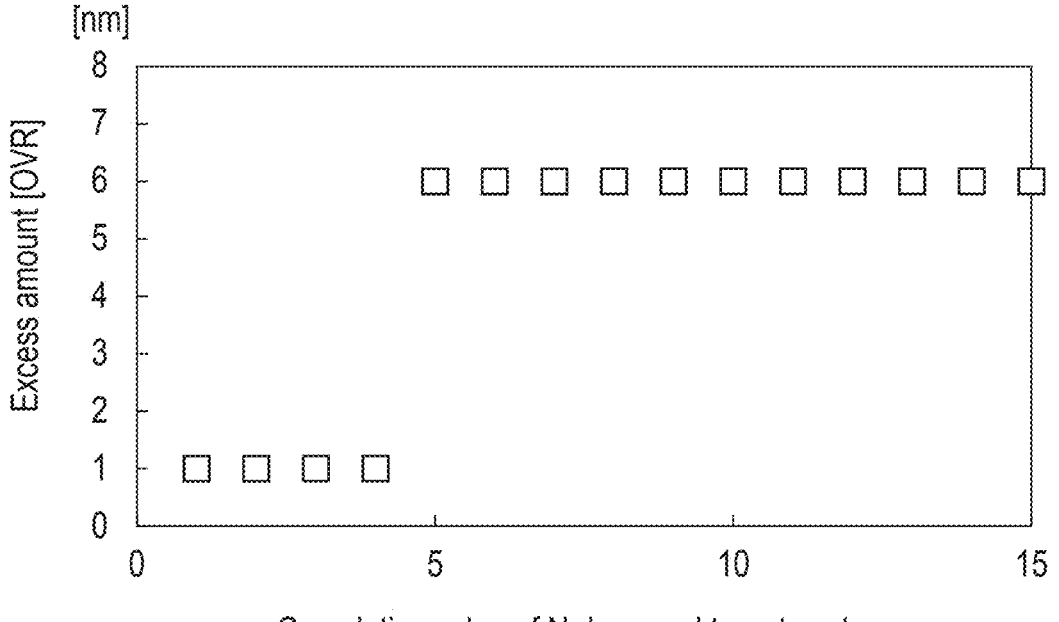
F I G. 16

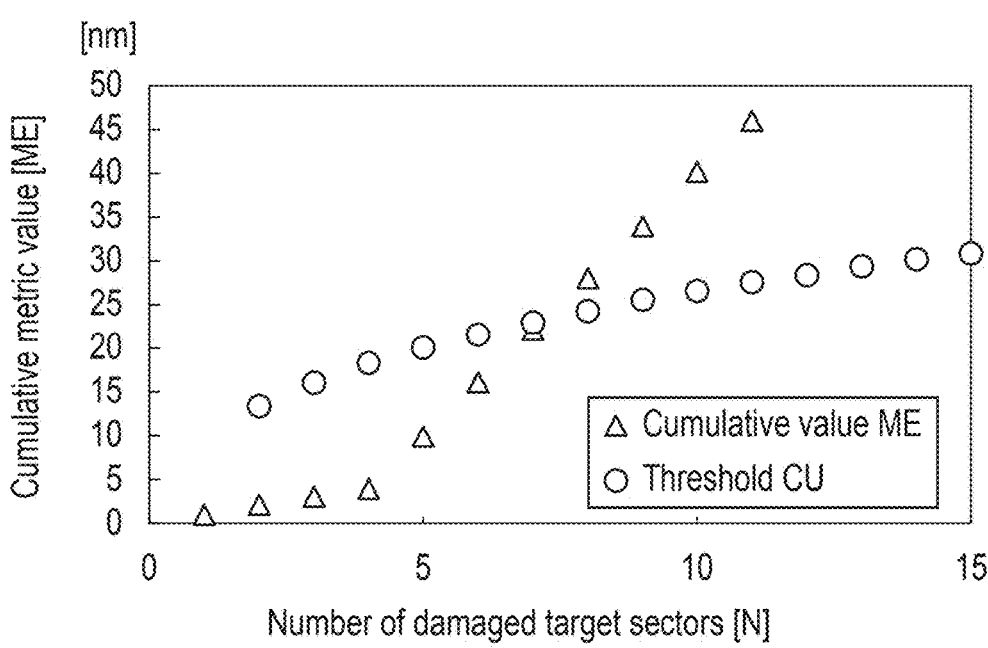
F I G. 17
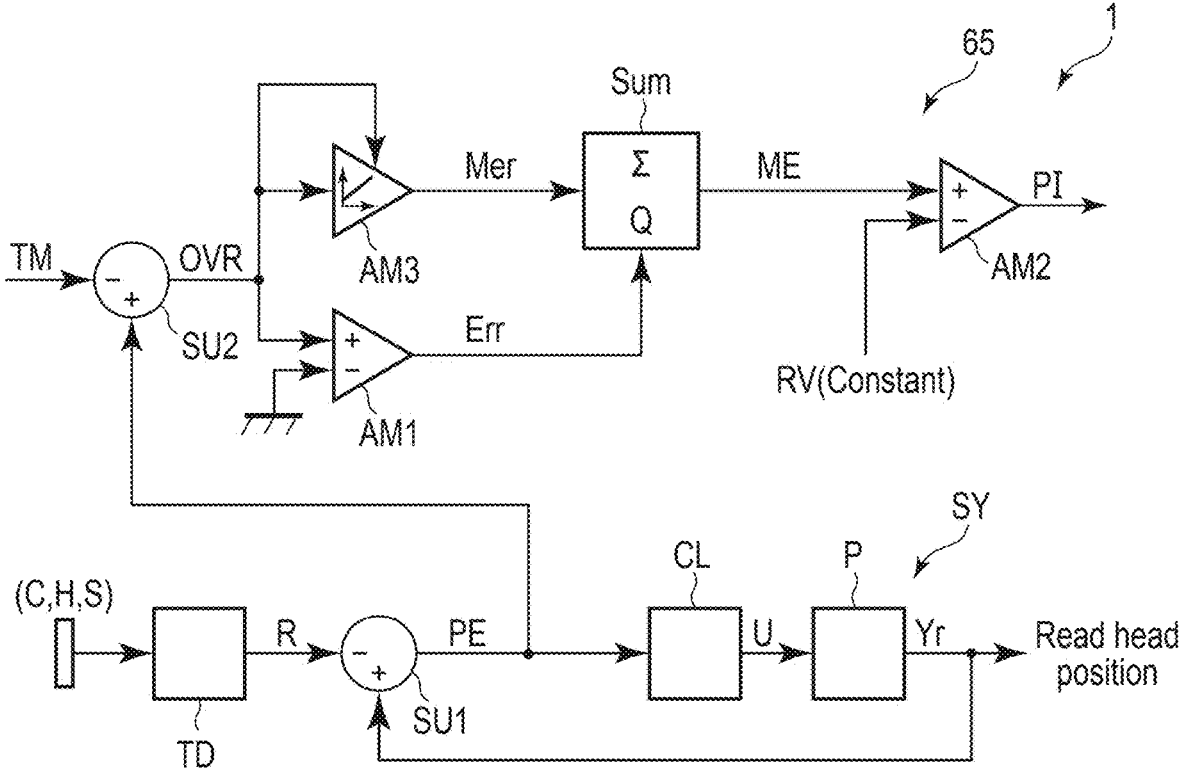
F I G. 18

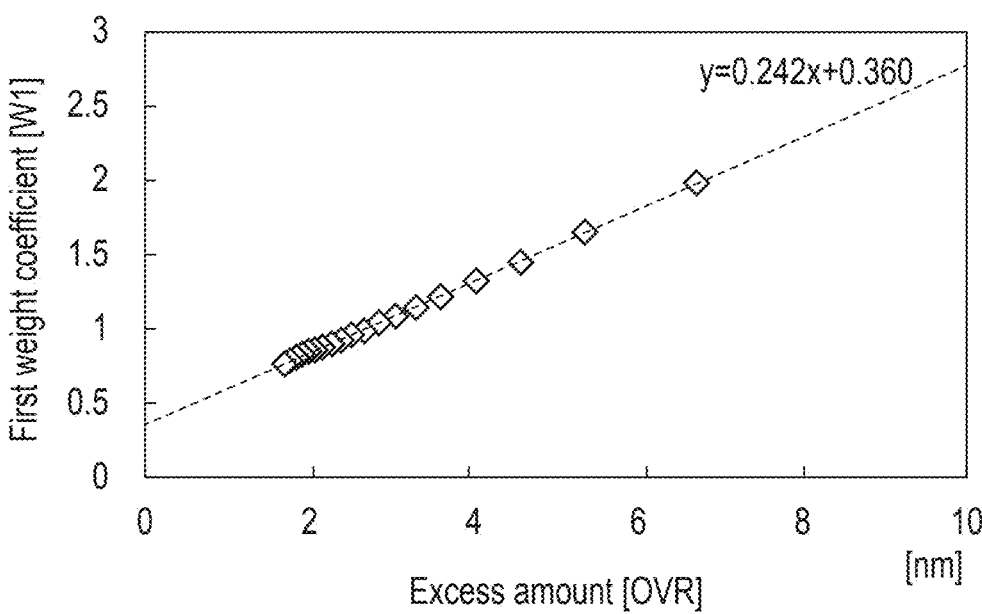
F I G. 19
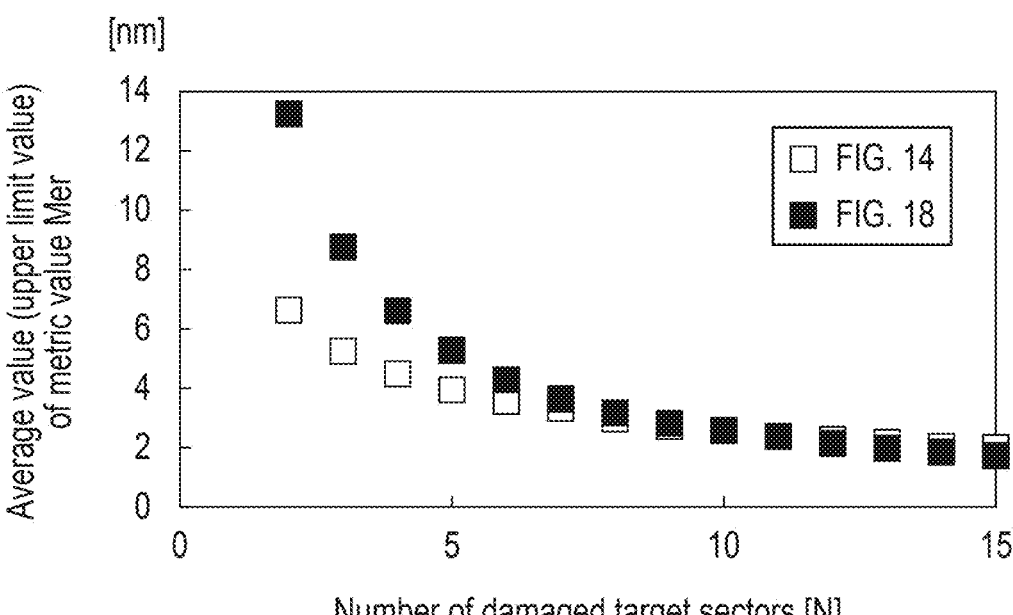
F I G. 20

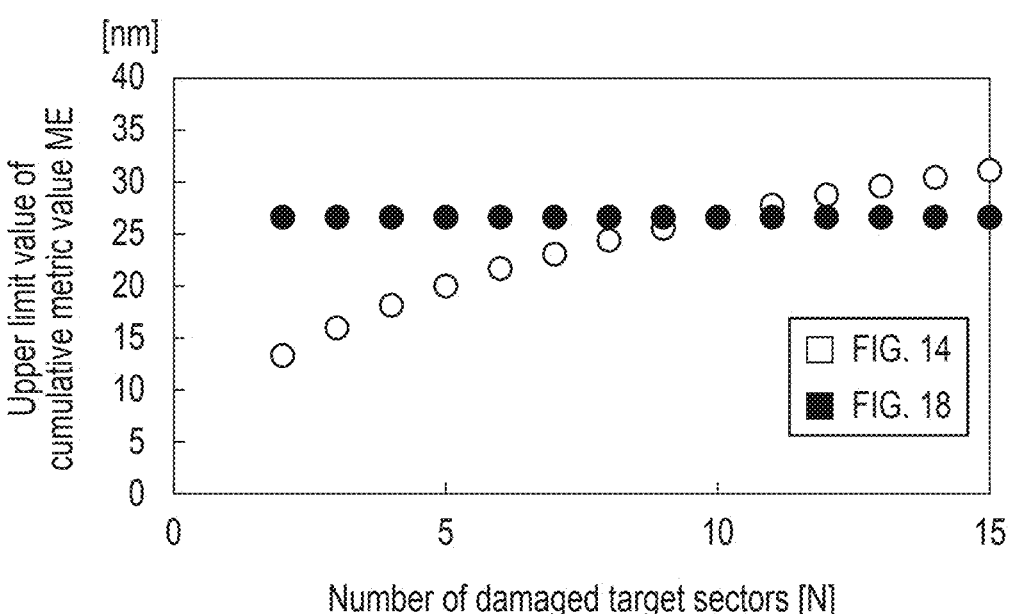
F I G. 21
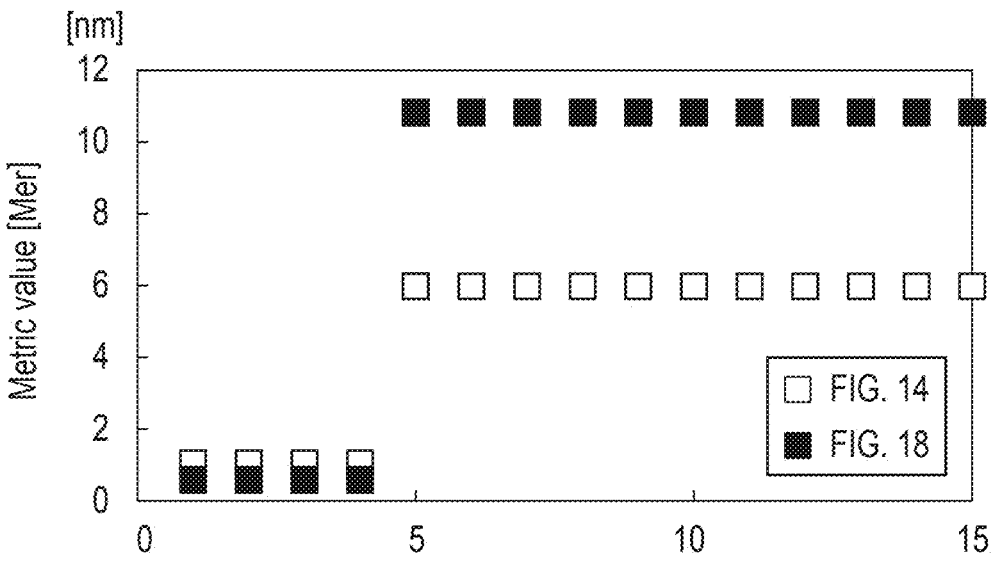
F I G. 22

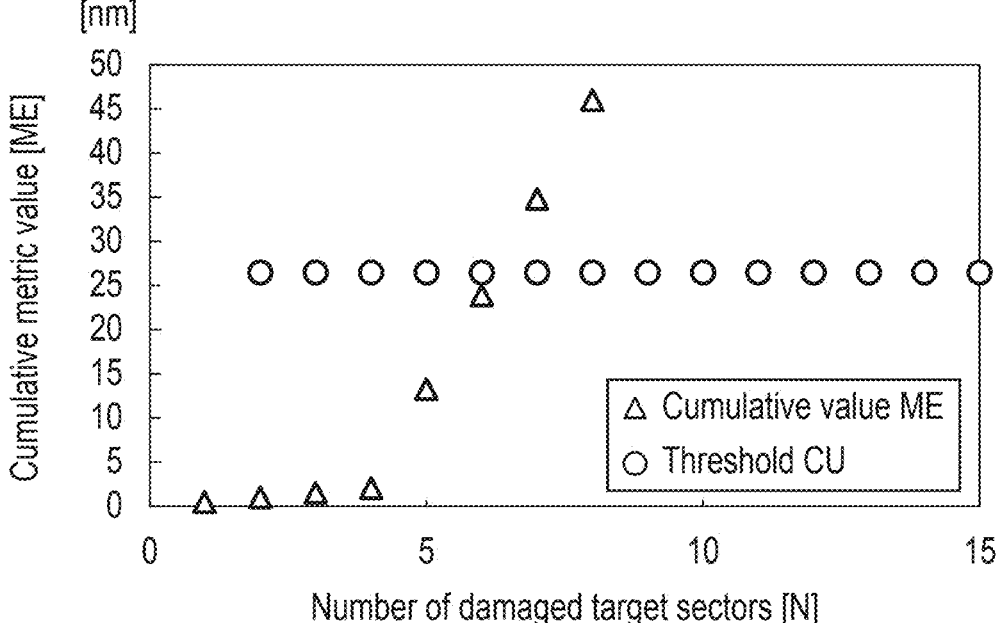
F I G. 23

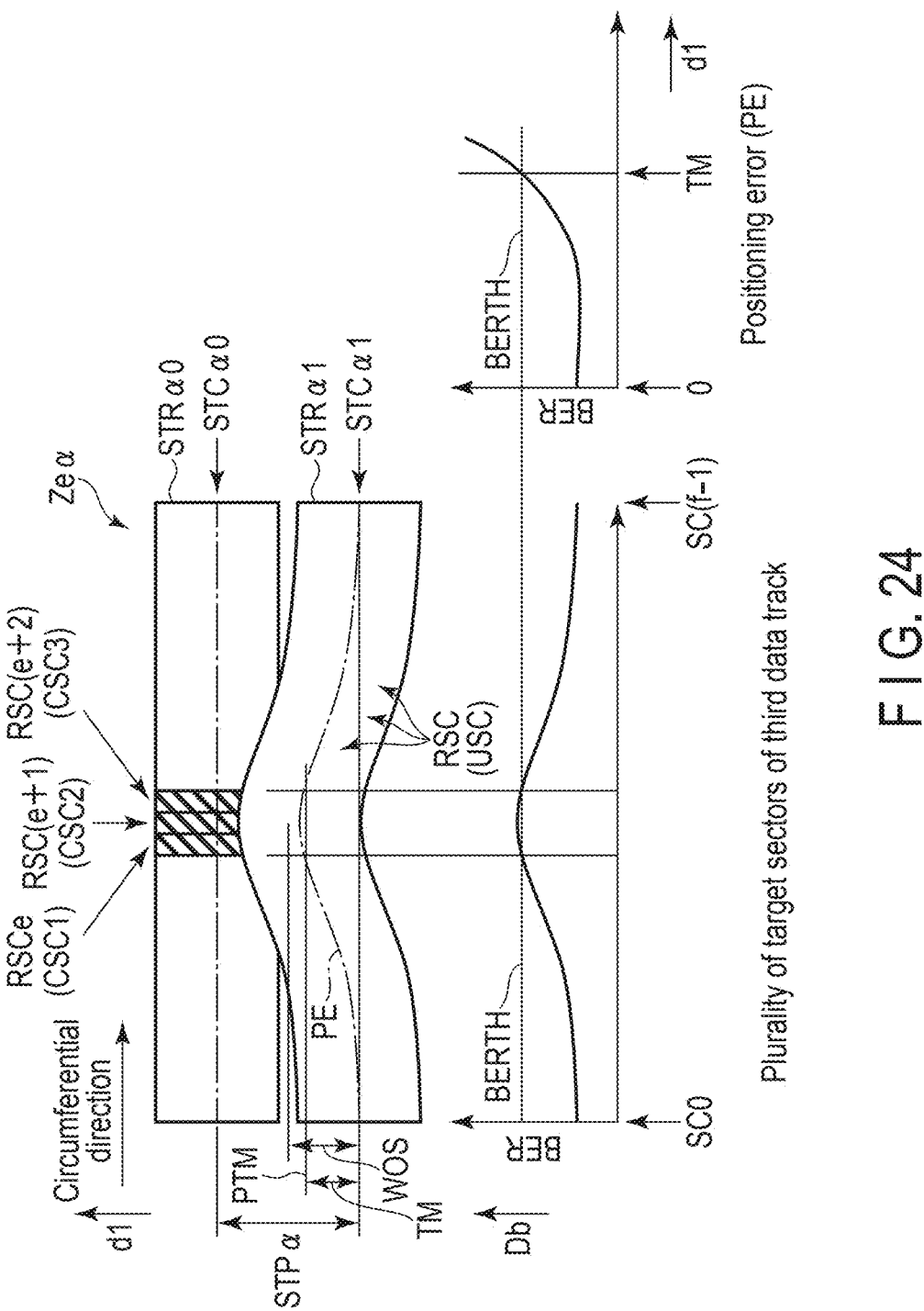
F I G. 24

MAGNETIC DISK DEVICE

CROSS-REFERENCE TO RELATED APPLICATIONS

This application is based upon and claims the benefit of priority from Japanese Patent Application No. 2024-118512, filed Jul. 24, 2024, the entire contents of which are incorporated herein by reference.

FIELD

Embodiments described herein relate generally to a magnetic disk device.

BACKGROUND

Known magnetic disk devices include conventional magnetic recording (CMR) type (or conventional recording type) magnetic disk devices that write multiple tracks at intervals in a radial direction of a disk, shingled magnetic recording (SMR) type magnetic disk devices that overwrite multiple tracks in the radial direction of the disk, and hybrid recording-type magnetic disk devices that select and execute either the conventional magnetic recording type or the shingled magnetic recording type.

BRIEF DESCRIPTION OF THE DRAWINGS

FIG. 1 is a block diagram showing a configuration of a magnetic disk device according to a first embodiment.

FIG. 4 is a schematic view showing three tracks of a user data area where shingled magnetic recording processing is performed on the disk shown in FIG. 3, and a write head.

FIG. 5 is a schematic view showing three tracks of a media cache where conventional magnetic recording processing is performed on the disk shown in FIG. 3, and the write head.

FIG. 6 is a schematic view showing an example of data write processing on a disk.

FIG. 7 is a schematic view showing two bands and one guard band of a user data area shown in FIG. 6.

FIG. 8 is a schematic view showing three sectors in one track of a band shown in FIG. 6.

FIG. 9 is a schematic view showing two bands and one guard band shown in FIG. 7, and illustrates multiple target sectors and multiple unused sectors.

FIG. 10 is a schematic view showing an example of a first track and a second track in a case where it is assumed that the magnetic disk device described above does not have a function to execute track-by-track error correction for track data, and illustrates write processing for the first track and the second track, as well as a state in which the write processing for the second track is continued until a sector-by-sector error correction for the first track reaches its limit, and shows changes in BER for the first track and changes in BER for positioning errors, respectively, by a graph.

FIG. 11 is a schematic view showing an example of a first track and a second track in a case where it is assumed that the magnetic disk device described above does not have a function to execute track-by-track error correction for track data, and illustrates write processing for the first track and the second track, as well as a state in which a judgment value is set to a write-off track slice that is smaller (stricter) than a track margin, and write processing for the second track is ended when it is detected that a positioning error has reached or exceeded the write-off track slice, and shows changes in BER for the first track and changes in BER for positioning errors, respectively, by a graph.

FIG. 12 is a schematic view showing an example of a first track and a second track of the magnetic disk device described above that has a function to execute track-by-track error correction for track data, and illustrates write processing for the first track and the second track, as well as a state in which a judgment value is set to a write-off track slice that is larger (looser) than a track margin, and write processing for the second track is continued until the track-by-track error correction for the first track reaches its limit, and shows changes in BER for the first track and changes in BER for positioning errors, respectively, by a graph.

FIG. 13 is a schematic view showing an example of changes in track ECC Gain with respect to squeeze counts.

FIG. 14 is a block diagram showing an example of a head positioning control system and a correction limit prediction unit.

FIG. 15 is a graph exemplifying changes in a plurality of identical upper limit excess amounts and changes in cumulative upper limit threshold values, respectively, with respect to the number of damaged target sectors in the first track.

FIG. 16 is a graph exemplifying a cumulative value of the number of damaged target sectors in the first track and an excess amount of each damaged target sector.

FIG. 17 is a graph exemplifying changes in a cumulative metric value with respect to the number of damaged target sectors in the first track, together with a graph showing changes in the cumulative upper limit threshold values shown in FIG. 15.

FIG. 18 is a block diagram showing an example of the head positioning control system and the correction limit prediction unit according to the embodiment described above.

FIG. 19 is a graph showing changes in a first weight coefficient with respect to an excess amount.

FIG. 20 is a graph exemplifying changes in an average value of a metric value with respect to the number of damaged target sectors.

FIG. 21 is a graph exemplifying changes in an upper limit value of a cumulative metric value with respect to the number of damaged target sectors.

FIG. 22 is a graph exemplifying a cumulative value of the number of damaged target sectors in the first track and each metric value.

FIG. 23 is a graph exemplifying changes in a cumulative metric value with respect to the number of damaged target sectors in the first track, together with a graph in which the cumulative upper limit threshold value shown in FIG. 21 is constant.

FIG. 24 is a schematic view showing an example of a third track and a fourth track of a magnetic disk device according to a second embodiment, which illustrates write processing for the third track and the fourth track, in which a judgment value is set to a write-off track slice that is larger (looser) than a track margin, and illustrates a state in which the write processing for the fourth track is continued until a track-by-track error correction for the third track reaches its limit, and shows changes in BER for the third track and changes in BER for positioning errors, respectively, by a graph.

DETAILED DESCRIPTION

Figure 2:
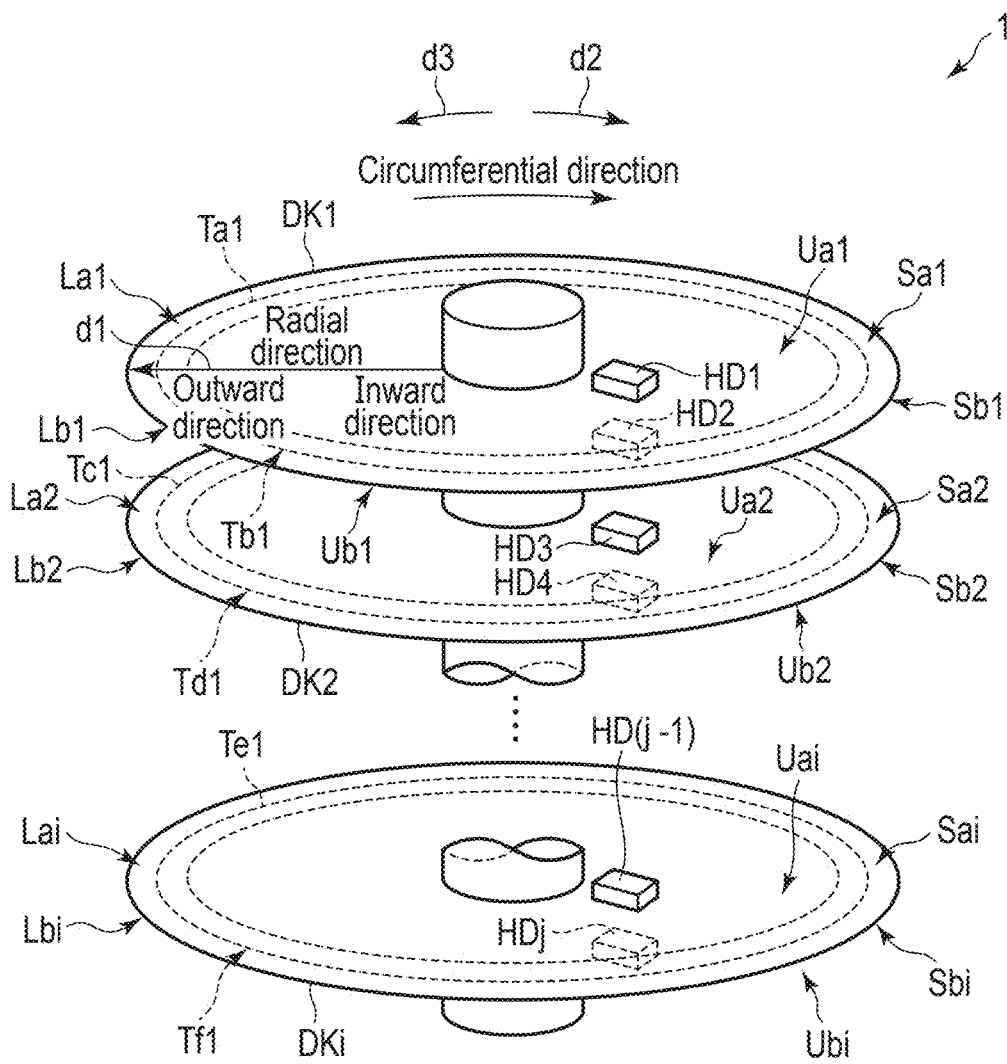
FIG. 2 is a perspective view showing part of the magnetic disk device described above, and shows multiple disks and multiple heads.

In general, according to one embodiment, there is provided a magnetic disk device comprising: a first disk having a first data track and a second data track adjacent to each other in a first recording layer, in which the first data track and the second data track each include a plurality of target sectors to which data is written, and the first data track is located in a first direction parallel to a radial direction of the first disk when viewed from the second data track; a first write head that writes data to the first recording layer of the first disk; a write processing unit that is capable of executing write processing to write data to the first recording layer; an error correction unit that executes error correction of data in one or more damaged target sectors of the plurality of target sectors of the first data track that are determined to be damaged; a correction limit prediction unit; and a determination unit, in which during a write period in which the write processing is executed for the plurality of target sectors of the second data track after the write processing is executed for the plurality of target sectors of the first data track, the correction limit prediction unit calculates an excess amount by which a position of the first write head protrudes from a first reference radial position in the first direction each time data is written to each of the target sectors of the second data track, calculates a metric value by multiplying a first weight coefficient, which is a variable whose value changes in accordance with the excess amount, by the excess amount each time the position of the first write head exceeds the first reference radial position, updates a cumulative metric value, which is a cumulative total of the metric values during the write period, and generates first prediction information, which is information predicting whether or not the error correction for the first data track will reach its limit based on the cumulative metric value, before the write processing for all target sectors of the second data track is completed, and the determination unit determines whether or not to allow the write processing unit to continue the write processing for the second data track based on the first prediction information.

First Embodiment

Hereinafter, a magnetic disk device 1 according to a first embodiment will be described in detail with reference to the drawings. First, a configuration of the magnetic disk device 1 is described. FIG. 1 is a block diagram showing the configuration of the magnetic disk device 1 according to this first embodiment. In the present embodiment, the magnetic disk device 1 is a hybrid recording-type magnetic disk device that selects and executes either a conventional magnetic recording type or a shingled magnetic recording type. However, the technology described below may be applied to a conventional magnetic recording-type magnetic disk device or a shingled magnetic recording-type magnetic disk device.

As shown in FIG. 1, the magnetic disk device 1 comprises a plurality of disks (magnetic disks) DK, for example, one to ten disks, as recording media, a spindle motor (SPM) 20 as a drive motor, a head stack assembly 22, a driver IC 120, a head amplifier integrated circuit (hereinafter referred to as a head amplifier IC or preamplifier) 130, a volatile memory 70, a buffer memory (buffer) 80, a nonvolatile memory 90, and a system controller 110, which is a single-chip integrated circuit. In addition, the magnetic disk device 1 is connected to a host system (hereinafter simply referred to as a host) 100.

Each disk DK is, for example, formed to have a diameter of 97 mm (3.8 inches) and has a recording layer (magnetic recording layer) on both sides. In this first embodiment, the magnetic disk device 1 is provided with 1 to 11 disks DK; however, the number of disks DK is not limited thereto.

The head stack assembly 22 can control moving a head HD mounted on an arm 30 to a target position on the disk DK by driving a voice coil motor (hereinafter referred to as a VCM) 24, i.e., can seek. The VCM 24 functions as an actuator.

The disk DK has, in data writeable areas thereof, a user data area U, which can be used by a user, and a system area S, which is used to write information necessary for system management.

The head HD records and reproduces information on the disk DK. The head HD has a slider as its main body, and comprises a write head WHD and a read head RHD mounted on the slider. The write head WHD writes data to a recording layer of the disk DK. The read head RHD reads data from a data track of the recording layer of the disk DK.

In some cases, "a center portion of the head HD" is referred to as the "head HD", "a center portion of the write head WHD" is referred to as the "write head WHD", and "a center portion of the read head RHD" is referred to as the "read head RHD". In some cases, the "center portion of the write head WHD" is simply referred to as the "head HD", and in other cases, the "center portion of the read head RHD" is simply referred to as the "head HD".

The driver IC 120 controls driving the SPM 20 and the VCM 24 in accordance with the control of the system controller 110 (in detail, an MPU 60 described below). The SPM 20 supports and rotates a plurality of disks DK.

The head amplifier IC 130 comprises a read amplifier and a write driver. The read amplifier amplifies a read signal read from the disk DK and outputs it to the system controller 110 (in detail, to a read/write (R/W) channel 140, which will be described later). The write driver outputs a write current corresponding to the signal output from the R/W channel 140 to the head HD.

The volatile memory 70 is a semiconductor memory in which stored data is lost when power supply is cut off. The volatile memory 70 stores data, etc., necessary for processing in each part of the magnetic disk device 1. The volatile memory 70 is random access memory (RAM). The volatile memory 70 is, for example, dynamic random access memory (DRAM). However, the volatile memory 70 may also be synchronous dynamic random access memory (SDRAM).

The buffer memory 80 is a semiconductor memory that temporarily records data, etc. transmitted and received between the magnetic disk device 1 and the host 100. Note that, the buffer memory 80 may be integrated with the volatile memory 70. The buffer memory 80 is volatile RAM. Examples include DRAM, static random access memory (SRAM), SDRAM, ferroelectric random access memory (FeRAM), and magnetoresistive random access memory (MRAM).

The buffer memory 80 includes an area used as a read cache and a write cache, and temporarily stores commands received from the host 100, etc.

The nonvolatile memory 90 is a semiconductor memory that stored data even when the power supply is cut off. The nonvolatile memory 90 is, for example, a NAND-type flash read only memory (FROM). However, the nonvolatile memory 90 may also be a NOR-type FROM.

The system controller (controller) 110 is realized, for example, by using a large scale integrated circuit (LSI)

called a system-on-a-chip (SoC) in which a plurality of elements are integrated on a single chip. The system controller 110 includes the read/write (R/W) channel 140, a hard disk controller (HDC) 150, and the microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 in response to instructions from the MPU 60 described below. The R/W channel 140 has a circuit or function for modulating write data. The R/W channel 140 also has a circuit or function for measuring the signal quality of the read data. The R/W channel 140 is electrically connected to, for example, the head amplifier IC 130, the HDC 150, and the MPU 60.

The HDC 150 controls data transfer between the host 100 and the R/W channel 140 in response to instructions from the MPU 60 described below. The HDC 150 is electrically connected to, for example, the R/W channel 140, the MPU 60, the volatile memory 70, the buffer memory 80, and the nonvolatile memory 90.

The HDC 150 has a gate generation unit. The gate generation unit generates various types of gates, such as write gates, read gates, and servo gates, in response to commands from the host 100, instructions from the MPU 60, etc., and outputs them to the R/W channel 140, such as to a gate detection unit. In the following, "raising a predetermined gate" may also be referred to as "asserting a predetermined gate". Also, "lowering a predetermined gate" may be referred to as "negating a predetermined gate". "Asserting a predetermined gate" and "negating a predetermined gate" may also include the meaning of "generating a predetermined gate". Note that the gate generation unit may be included in the R/W channel 140 or the MPU 60.

The R/W channel 140 has a gate detection unit. The gate detection unit detects whether various gates, such as write gates, read gates, and servo gates, are in the asserted state or the negated state.

For example, in a case where the gate detection unit detects that a write gate is asserted, it executes write processing, and in a case where it detects that the write gate is negated, it suspends (stops) the write processing.

In addition, in a case where the gate detection unit detects that a read gate is asserted, it executes read processing, and in a case where it detects that the read gate is negated, it stops the read processing. The gate detection unit executes servo read processing in a case where it detects that a servo gate is asserted, and stops the servo read processing in a case where it detects that the servo gate is negated. Note that the gate detection unit may also be located in the HDC 150 or the MPU 60.

The MPU 60 is a control unit that controls each part of the magnetic disk device 1 and is a main controller. The MPU 60 controls the VCM 24 via the driver IC 120 and executes servo control to position the head HD. The MPU 60 controls a write operation of data to the disk DK and selects a destination for storing write data transferred from the host 100. In addition, the MPU 60 controls a read operation of data from the disk DK and controls processing of read data transferred from the disk DK to the host 100. The MPU 60 is connected to each part of the magnetic disk device 1. The MPU 60 is electrically connected to, for example, the driver IC 120, the R/W channel 140, and the HDC 150.

The MPU 60 comprises a read/write processing unit 61, an error correction unit 64, a correction limit prediction unit 65, a determination unit 66, a switching unit 67, etc. The MPU 60 executes processing of each of these units, such as the read/write processing unit 61, the error correction unit 64, the correction limit prediction unit 65, the determination unit 66, and the switching unit 67, on the firmware. Note that the MPU 60 may also comprise each of these units as a circuit.

The read/write processing unit 61 has a write processing unit 62 and a read processing unit 63. In accordance with commands from the host 100, the write processing unit 62 controls data write processing, and the read processing unit 63 controls data read processing, causing the read head RHD to read data from the disk DK. The write processing unit 62 is capable of executing write processing to write data to the recording layer of the disk DK. The read/write processing unit 61 controls the VCM 24 via the driver IC 120 to position the head HD at a target position (a predetermined radial position) on the disk DK and execute read or write processing.

FIG. 2 is a perspective view showing part of the magnetic disk device 1, and shows a plurality of disks DK and a plurality of heads HD.

As shown in FIG. 2, a direction in which the disk DK rotates in a circumferential direction is referred to as a rotation direction d3. Note that, in the example shown in FIG. 2, the rotation direction d3 is shown as counterclockwise; however, it may also be in an opposite direction (clockwise). In addition, a traveling direction d2 of the head HD relative to the disk DK is in an opposite direction to the rotation direction d3. The traveling direction d2 is a direction in which the head HD sequentially writes and reads data with respect to the disk DK in the circumferential direction, that is, the direction in which the head HD travels with respect to the disk DK in the circumferential direction.

The magnetic disk device 1 comprises i disks of disks DK1 to DKi and j heads of heads HD1 to HDj. In the present embodiment, the number of heads HD is twice the number of disks DK (j=2×i).

Disks DK1 to DKi are arranged coaxially and stacked with a gap between them. The diameter of disks DK1 to DKi is the same. Here, the terms "same", "identical", "match", and "equivalent" include the meaning of being exactly the same as well as the meaning of being different to the extent that they can be considered to be substantially the same. Note that the diameter of disks DK1 to DKi may differ from each other.

Each disk DK has a recording layer L on both sides. For example, the disk DK1 has a first recording layer La1 and a second recording layer Lb1 on the opposite side of the first recording layer La1. The disk DK2 has a first recording layer La2 and a second recording layer Lb2 on the opposite side of the first recording layer La2. The disk DKi has a first recording layer Lai and a second recording layer Lbi on the opposite side of the first recording layer Lai. Each of the first recording layers La may also be referred to as a front surface or a recording surface. Each of the second recording layers Lb may also be referred to as a back surface or a recording surface.

However, each of the first recording layers La may also be referred to as the back surface. In this case, each of the second recording layers Lb may also be referred to as the front surface.

Each recording layer L has a user data area U and a system area S. The first recording layer La1 has a user data area Ua1 and a system area Sa1. The second recording layer Lb1 has a user data area Ub1 and a system area Sb1. The first recording layer La2 has a user data area Ua2 and a system area Sa2. The second recording layer Lb2 has a user data area Ub2 and a system area Sb2. The first recording layer Lai has a user data area Uai and a system area Sai. The second recording layer Lbi has a user data area Ubi and a system area Sbi.

In the user data area Ua1 (first recording layer La1), a track sandwiched between double broken lines in the drawing is track Ta1. In the user data area Ub1 (second recording layer Lb1), a track located on an opposite side of track Ta1 is track Tb1.

In the user data area Ua2 (first recording layer La2), a track sandwiched between double broken lines in the drawing is track Tc1. In the user data area Ub2 (second recording layer Lb2), a track located on an opposite side of track Tc1 is track Td1.

In the user data area Uai (first recording layer Lai), a track sandwiched between double broken lines in the drawing is track Tel. In the user data area Ubi (second recording layer Lbi), a track located on an opposite side of track Tel is track Tf1.

In the present embodiment, tracks Ta1, Tb1, Tc1, Td1, Te1, and Tf1 are located on a same cylinder.

The head HD is facing the disk DK. In the present embodiment, each recording layer L of the disk DK faces one head HD. For example, the head HD1 faces the first recording layer La1 of the disk DK1, writes data to the first recording layer La1, and reads data from the first recording layer La1. The head HD2 faces the second recording layer Lb1 of the disk DK1, writes data to the second recording layer Lb1, and reads data from the second recording layer Lb1.

The head HD3 faces the first recording layer La2 of the disk DK2, writes data to the first recording layer La2, and reads data from the first recording layer La2. The head HD4 faces the second recording layer Lb2 of the disk DK2, writes data to the second recording layer Lb2, and reads data from the second recording layer Lb2. The head HDj−1 faces the first recording layer Lai of the disk DKi, writes data to the first recording layer Lai, and reads data from the first recording layer Lai. The head HDj faces the second recording layer Lbi of the disk DKi, writes data to the second recording layer Lbi, and reads data from the second recording layer Lbi.

Figure 3:
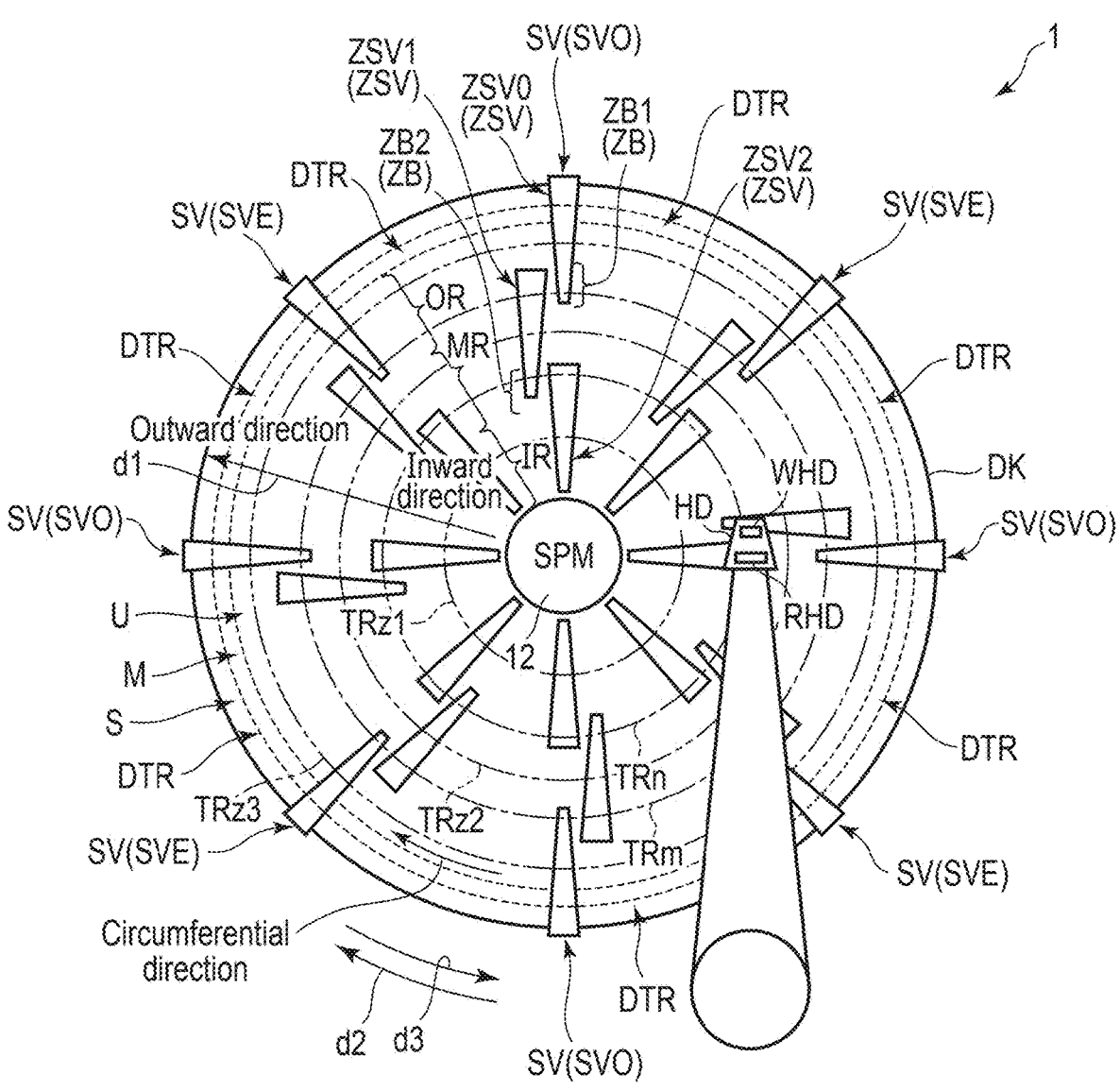
FIG. 3 is a schematic view showing an example of an arrangement of multiple servo areas and multiple data areas on a single disk according to the embodiment described above.

FIG. 3 is a schematic view showing an example of an arrangement of a plurality of servo areas SV and a plurality of data areas DTR of a single disk DK according to this first embodiment. As shown in FIG. 3, a direction towards an outer circumference of the disk DK in a radial direction d1 of the disk DK is referred to as an outer direction (outside), and a direction opposite to the outer direction is referred to as an inner direction (inside).

In FIG. 3, the user data area U is divided into an inner circumferential area IR, which is located in the inner direction, an outer circumferential area OR, which is located in the outer direction, and a middle circumferential area MR, which is located between the inner circumferential area IR and the outer circumferential area OR.

The disk DK has a plurality of servo areas SV and a plurality of data areas DTR. The plurality of servo areas SV may be, for example, radially extended in a radial direction of the disk DK and arranged discretely at predetermined intervals in the circumferential direction. The plurality of servo areas SV may be, for example, linearly extended from the inner circumference to the outer circumference and arranged discretely at predetermined intervals in the circumferential direction. For example, the plurality of servo areas SV may extend spirally from the inner circumference to the outer circumference, and may be discretely arranged at predetermined intervals in the circumferential direction. In addition, the plurality of servo areas SV may be arranged, for example, in an island shape in the radial direction and may be arranged discretely by changing predetermined intervals in the circumferential direction.

In the following, a single servo area SV in a predetermined track may be referred to as a "servo sector". Note that a "servo area SV" may be referred to as a "servo sector SV". A servo sector contains servo data. In the following, "the arrangement of several servo data that make up a servo sector, etc." may be referred to as a "servo pattern". Note that "servo data written to a servo sector" may be referred to as a "servo sector".

A plurality of data areas DTR are each arranged between a plurality of servo areas SV. For example, a data area DTR corresponds to an area between two consecutive servo areas SV in the circumferential direction. In the following, a data area DTR in a predetermined track may be referred to as a "data sector". Note that the "data area DTR" may be referred to as the "data sector DTR". The data sector contains user data. Note that "user data written to a data sector" may be referred to as a "data sector". The "data sector" may be referred to as "user data". In addition, "a pattern made up by several data" may be referred to as "data pattern". In the example shown in FIG. 3, the data pattern of a predetermined track is configured by a plurality of servo data (servo sectors) and a plurality of user data (data sectors).

The servo area SV has a plurality of zone servo areas ZSV, etc. Note that, in addition to the zone servo areas ZSV, the servo area SV may also include an area that includes a gap (a difference in circumferential position between two zone servo areas), an area that includes servo data, and a data area DTR, etc. The plurality of zone servo areas ZSV are arranged discretely along a radial direction d1. The plurality of zone servo areas ZSV extend in the radial direction d1.

One zone servo area (servo area) ZSV in a predetermined track may be called a "zone servo sector" or a "servo sector". Note that the "zone servo area (servo area) ZSV" may also be referred to as a "zone servo sector ZSV" or a "servo sector ZSV". "Servo data written to the zone servo sector" may also be referred to as a "zone servo sector" or a "servo sector". In the following, "the arrangement of several servo data that make up the zone servo sector, etc." may also be referred to as a "zone servo pattern" or a "servo pattern". In the following, a single servo area SV in a predetermined track may also be referred to as a "zone pattern sector".

Note that the "servo area SV" may be referred to as a "zone pattern sector". "At least one data item, etc., written to the zone pattern sector" may be referred to as the "zone pattern sector". The zone pattern sector includes at least one zone servo sector. In the following, "data pattern of the zone pattern sector" may be referred to as a "zone data pattern".

In the example shown in FIG. 3, the servo area SV has zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may also be arranged in a staircase pattern in the radial direction.

The zone servo area ZSV2 is located on the inner circumferential side of the zone servo area ZSV1. The zone servo area ZSV0 is located on the outer circumferential side of the zone servo area ZSV1. For example, the zone servo area ZSV2 is arranged from the inner circumferential area IR to the middle circumferential area MR, the zone servo area ZSV1 is arranged from the inner circumferential area IR to the outer circumferential area OR, and the zone servo area ZSV0 is arranged from the middle circumferential area MR to the outer circumferential area OR. In the following, in a predetermined servo area SV, a predetermined area in the radial direction in which a plurality of zone servo areas ZSV are arranged in the circumferential direction may be referred to as a zone servo boundary area, a double servo area, or a double zone servo area ZB.

In the example shown in FIG. 3, a main servo area SVO and a sub-servo area SVE are arranged alternately at intervals in the circumferential direction. For example, one sub-servo area SVE is arranged between two main servo areas SVO that are aligned continuously at intervals in the circumferential direction. In other words, one sub-servo area SVE is arranged between two main servo areas SVO that are aligned continuously at intervals in the circumferential direction. For example, in a case where all the servo areas SV on the disk DK are numbered sequentially, the main servo area SVO corresponds to the odd-numbered servo areas SV, and the sub-servo area SVE corresponds to the even-numbered servo areas SV. Note that two or more sub-servo areas SVE may be arranged between two main servo areas SVO that are aligned continuously at intervals in the circumferential direction.

The main servo area SVO and the sub-servo area SVE may, for example, be configured only by a servo area (hereinafter, sometimes referred to as a normal servo area) that reads and demodulates servo data in its entirety. In the following, "reading and demodulating servo data" may be referred to as "servo reading". The main servo area SVO and the sub-servo area SVE may, for example, be configured by a normal servo area and a servo area (hereinafter referred to as a short servo area) in which servo data is servo read in a circumferential range smaller than the circumferential range of the servo data servo read in the normal servo area.

A media cache M is allocated to the disk DK. However, the media cache M does not have to be arranged in the disk DK.

By using the above-mentioned plurality of servo data, for example, a positioning error of the head HD (e.g., write head WHD) can be derived.

In the description of this first embodiment, an example of a case in which the number of zones on the disk DK is three is described; however, the number of zones on the disk DK can be changed in various ways. The number of zones on the disk DK can be 30 to 40. In addition, each zone has a plurality of bands. For example, each zone has several hundred bands.

FIG. 4 is a schematic view showing three tracks STR of the user data area U on which shingled magnetic recording processing is performed on the disk DK shown in FIG. 3, and the write head WHD. The user data area U is a shingled magnetic recording area. Within the user data area U, it is permitted to write data sequentially in units of bands, that is, shingled magnetic recording is permitted.

As shown in FIG. 4, the write head WHD can sequentially write data to the disk DK in the traveling direction d2. The read head RHD shown in FIG. 3 can also sequentially read data written to the disk DK in the traveling direction d2.

The direction in which shingled magnetic recording is performed continuously on a plurality of tracks STR, which are a plurality of data tracks, in a direction parallel to the radial direction d1, that is, the direction in which the next track STR to be written is overlapped on the previously written track STR in the radial direction d1, is referred to as a overwrite direction or a recording traveling direction. In band BAe shown in FIG. 4, a overwrite direction d5 corresponds to the inner direction; however, the overwrite direction may also correspond to the outer direction.

For example, the overwrite direction applied to a plurality of bands BA (a plurality of zones Z) located on the outer circumferential side of a specific radial position and the overwrite direction applied to a plurality of bands BA (a plurality of zones Z) located on the inner circumferential side of the above-mentioned specific radial position may be opposite to each other.

The band BAe has a plurality of tracks STR, including tracks STRe, STRe+1, and STRe+2. Tracks STRE, STRe+1, and STRe+2 are continuously overwritten in the overwrite direction d5 in the order in which they are described. Of tracks STRe, STRe+1, and STRe+2, track STRe corresponds to the track on which data is written first, and track STRe+2 corresponds to the track on which data is written last.

Track STRe has a track center STCe at the center of the radial direction d1 in a case where no other tracks are overwritten. Track STRe+1 has a track center STCe+1 at the center of the radial direction d1 in a case where no other tracks are overwritten. Track STRe+2 has a track center STCe+2 at the center of the radial direction d1 in a case where no other tracks are overwritten.

In the example shown in FIG. 4, tracks STRe, STRe+1, and STRe+2 are written at a pitch (shingled magnetic recording track pitch) STP. The track center STCe of track STRe and the track center STCe+1 of track STRe+1 are separated by pitch STP in the radial direction d1. The track center STCe+1 of track STRe+1 and the track center STCe+2 of track STRe+2 are separated by pitch STP in the radial direction d1. Tracks STRe to STRe+2 may be written with different pitches.

The width of the radial direction d1 of the area of track STRe where track STRe+1 is not overwritten is the same as the width of the radial direction d1 of the area of track STRe+1 where track STRe+2 is not overwritten. Note that the width of the radial direction d1 of the area of track STRe where track STRe+1 is not overwritten and the width of the radial direction d1 of the area of track STRe+1 where track STRe+2 is not overwritten may differ.

In FIG. 4, for convenience of explanation, each track STR is shown as a rectangular shape; however, in reality, each track STR is curved along the circumferential direction. Also, each track STR may be wavy, extending in the circumferential direction while varying in the radial direction d1. Note that, in FIG. 4, three tracks STR are overwritten; however, two tracks STR may be overwritten, or more than three tracks STR may be overwritten.

The write processing unit 62 can select a shingled magnetic recording type in which data is written in an overlapping manner onto a plurality of tracks STR in the overwrite direction d5, and cause the write head WHD to write data onto each band BA. In the example shown in FIG. 4, the write processing unit 62 sequentially performs shingled magnetic recording on tracks STRe to STRe+2 in band BAe in the inner direction (overwrite direction d5) at pitch STP. Since the user data area U is an area where data is written in the shingled magnetic recording type, it is possible to improve the recording density of the user data area U.

The write processing unit 62 writes track STRe+1 in the inner direction of track STRe at pitch STP, and overwrites a portion of the inner circumferential side of track STRe with track STRe+1. The write processing unit 62 writes track STRe+2 in the inner direction of track STRe+1 at pitch STP, and overwrites a portion of the inner circumferential side of track STRe+1 with track STRe+2.

FIG. 5 is a schematic view showing three tracks CTR of the media cache M on which conventional magnetic recording processing is performed on the disk DK shown in FIG. 3, and the write head WHD. The media cache M and the system area S shown in FIG. 3 are conventional magnetic recording areas. In the media cache M and the system area S, random data writing is permitted, that is, conventional magnetic recording is permitted.

As shown in FIG. 5, the media cache M has a plurality of tracks CTR, including tracks CTRe, CTRe+1, and CTRe+2. The plurality of tracks CTR are each data tracks. For example, the width (track width) of tracks CTRe, CTRe+1, and CTRe+2 in the radial direction d1 is the same. Note that the track widths of tracks CTRe to CTRe+2 may differ from each other.

Track CTRe has a track center CTCe at the center of the radial direction d1, track CTRe+1 has a track center CTCe+1 at the center of the radial direction d1, and track CTRe+2 has a track center CTCe+2 at the center of the radial direction d1. In the example shown in FIG. 5, tracks CTRe, CTRe+1, and CTRe+2 are written at a pitch (conventional magnetic recording track pitch) CTP. The track center CTCe of track CTRe is separated from the track center CTCe+1 of track CTRe+1 by pitch CTP. The track center CTCe+1 of track CTRe+1 and the track center CTCe+2 of track CTRe+2 are separated by pitch CTP.

Tracks CTRe and CTRe+1 are separated by a gap GP. Tracks CTRe+1 and CTRe+2 are separated by the gap GP. Note that tracks CTRe to CTRe+2 may be written with different pitches. In FIG. 5, for convenience of explanation, each track CTR is shown as a rectangular shape; however, in reality, each track CTR is curved along the circumferential direction. Also, each track CTR may be wavy, extending in the circumferential direction while varying in the radial direction d1.

The write processing unit 62 can execute write processing by selecting a conventional magnetic recording type that writes data to a plurality of tracks CTR at intervals in the radial direction d1 of the disk DK. In the example shown in FIG. 5, the write processing unit 62 performs conventional magnetic recording on track CTRe or a predetermined sector of track CTRe in a predetermined area of the disk DK by positioning the write head WHD at the track center CTCe.

The write processing unit 62 performs conventional magnetic recording on track CTRe+1 or a predetermined sector of track CTRe+1 by positioning the write head WHD at the track center CTCe+1, which is separated from the track center CTCe of track CTRe by pitch CTP in the inner direction. The write processing unit 62 performs conventional magnetic recording on track CTRe+2 or a predetermined sector of track CTRe+2 by positioning the write head WHD at the track center CTCe+2, which is separated from the track center CTCe+1 of track CTRe+1 by pitch CTP in the inner direction.

The write processing unit 62 may sequentially perform conventional magnetic recording on tracks CTRe, CTRe+1, and CTRe+2 in a predetermined area of the disk DK, or may randomly perform conventional magnetic recording on predetermined sectors of track CTRe, predetermined sectors of track CTRe+1, and predetermined sectors of track CTRe+2.

FIG. 6 is a schematic view showing an example of the data write processing for the disk DK. The tracks STR and CTR are each a data track. As shown in FIG. 6, the user data area U has bands BAa, BAb, and BAc. Bands BAa, BAb, and BAc belong to a same zone Ze. In zone Ze, bands BAa, BAb, and BAc are arranged intermittently in the order in which they are described in the overwrite direction.

Bands BAa and BAb are adjacent to each other in the radial direction d1, and bands BAb and BAc are adjacent to each other in the radial direction d1.

Band BAa includes x tracks of tracks STRa0, STRa1, STRa2, . . . , STRa(x−3), STRa(x−2), and STRa(x−1). Shingled magnetic recording is performed on tracks STRa0 to STRa(x−1) in the overwrite direction d5 in the order of their description. In band BAa, track STRa0 corresponds to a first track where data is written first, and track STRa(x−1) corresponds to a last track where data is written last.

Band BAb includes x tracks of tracks STRb0, STRb1, STRb2, . . . , STRb(x−3), STRb(x−2), and STRb(x−1). Shingled magnetic recording is performed on tracks STRb0 to STRb(x−1) in the overwrite direction d5 in the order of their description. In band BAb, track STRb0 corresponds to a first track where data is written first, and track STRb(x−1) corresponds to a last track where data is written last.

Band BAc includes x tracks of tracks STRc0, STRc1, STRc2, . . . , STRc(x−3), STRc(x−2), and STRc(x−1). Shingled magnetic recording is performed on tracks STRc0 to STRc(x−1) in the overwrite direction d5 in the order of their description. In band BAc, track STRc0 corresponds to a first track where data is written first, and track STRc(x−1) corresponds to a last track where data is written last.

The number of tracks STR possessed by each band BA belonging to the same zone Z is the same. For example, the number of tracks STR possessed by each band BA belonging to zone Ze is the same. In other words, the number of tracks STR possessed by each band BA is fixed for each zone Z. In this example, the number of tracks STR possessed by each band BA belonging to zone Ze is x.

FIG. 6 shows tracks CTR (x−2) and CTR (x−1). In FIG. 6, conventional magnetic recording is performed on tracks CTR (x−2) and CTR (x−1) in the media cache M or the system area S. Tracks CTR (x−2) and CTR (x−1) are adjacent to each other in the radial direction d1.

FIG. 7 is a schematic view showing two bands BAa and BAb and one guard band GB of the user data area U shown in FIG. 6. As shown in FIG. 7, unlike the conventional magnetic recording method, the shingled magnetic recording method has the characteristic of overwriting part of the track STR, so the MPU 60 manages a track group of the user data area U in units called bands.

A guard band GB is generally provided between bands BA that are adjacent in the radial direction d1. The guard band GB includes a guard track GTR. Unlike this first embodiment, the guard band GB may include a plurality of guard tracks GTR. The guard band GB has the role of suppressing interference between adjacent bands BA. The guard band GB makes it possible to perform shingled magnetic recording in units of one band BA. In addition, the guard band GB makes it possible to separate the range (band BA) to be written sequentially.

For example, a track center STCa (x−3) of track STRa (x−3), a track center STCa (x−2) of track STRa(x−2), a track center STCa (x−1) of track STRa(x−1), a track center GTC of guard track GTR, a track center STCb0 of track STRb0, a track center STCb1 of track STRb1, and a track center STCb2 of track STRb2 are located at equal pitch in the overwrite direction d5.

Except for the guard band GB, the recording capacity of each band BA in the user data area U is usually determined in advance based on request specifications from a user. The MPU 60 can record data of the same capacity in each band BA. Generally, the recording capacity of each band BA is 128 MiB or 256 MiB.

FIG. 8 is a schematic view showing three sectors SCe, SC (e+1), and SC (e+2) of one track STRa0 of band BAa shown in FIG. 6. As shown in FIG. 8, each track STR has a plurality of sectors SC. Track STRa1 has a plurality of sectors SC, including sectors SCe, SC (e+1), and SC (e+2). The number of sectors SC that each track STR belonging to the same zone Z has is the same. In this first embodiment, the number of sectors Sc possessed by each track STR belonging to zone Ze is y.

Each sector SC has a length Ls in the circumferential direction of the disk DK. Each sector SC may be a split sector that is divided by a servo sector SV. In this case, the length of the sector SC does not have to be Ls.

The write head WHD is a magnetic head for energy assisted magnetic recording (EAMR). In this first embodiment, the write head WHD is configured to utilize energy other than magnetic energy; however, it is not limited thereto, and the write head WHD may be a magnetic head that is not configured to perform energy assisted magnetic recording.

FIG. 9 is a schematic view showing the two bands BAa and BAb and one guard band GB shown in FIG. 7, and illustrates a plurality of target sectors RSC and a plurality of unused sectors VSC.

In FIG. 9, for convenience of explanation, each track STR is shown as a rectangular shape; however, in reality, each track STR is curved along the circumferential direction. In addition, although the plurality of tracks STR are aligned in the overwrite direction d5 without overlapping, in reality, the plurality of tracks STR are aligned in the overwrite direction d5 while overlapping each other. Furthermore, the target sector RSC is indicated by a dot pattern in the drawing. The unused sector VSC is shown with no pattern.

As shown in FIG. 9, the band number of band BAa is "a" and the band number of band BAb is "b". The track number of each band BA is "0" to "x–1". The sector number of each track STR is "0" to "y–1". In the following, the sector SC of each band BA may be identified using the following code "SC (track number, sector number)".

In this first embodiment, band BAa is a band adjacent to band BAb, and is a band located above band BAb in the overwrite direction d5.

Each track STR of band BAa contains G target sectors RSC (one or more target sectors RSC) on which valid data is written. For example, track STRa0 has y target sectors RSC (G=y). All sectors SC of track STRa0 are target sectors RSC. Track STRa(x–1) has five target sectors RSC (G=5). The remaining sectors SC in track STRa(x–1) are unused sectors VSC, in which valid data has not been written.

From the above, the number of target sectors RSC of track STRa0 is different from the number of target sectors RSC of track STRa(x–1).

In each band BA of zone Ze, all sectors SC of x–1 tracks STR from 0 to x–2 are target sectors RSC in which valid data are written, and are recorded sectors USC. In the x–1 track STR of each band BA in zone Ze, the five sectors SC from 0 to 4 are target sectors RSC, and are recorded sectors USC. On the other hand, in the x–1 track STR, the remaining sectors SC from 5 to y–1 are unused sectors VSC, in which valid data is not written.

FIG. 10 is a schematic view showing an example of a first track STR0 and a second track STR1 in a case where it is assumed that the magnetic disk device 1 does not have a function to execute error correction for data of a track TR, and illustrates write processing for the first track STR0 and the second track STR1, as well as a state in which the write processing for the second track STR1 is continued until the error correction for each sector of the first track STR0 reaches its limit, and shows changes in a bit error rate (BER) for the first track STR0 and changes in the BER for a positioning error (position error) PE, respectively, by a graph. In the explanation using FIG. 10, the magnetic disk device 1 is explained as not comprising the error correction unit 64 shown in FIG. 1. Also, in FIG. 10, for convenience of explanation, the first track STR0, etc. are depicted as being linear in the circumferential direction.

As shown in FIG. 10, the first track STR0 and the second track STR1 are each data tracks, and all sectors SC of the first track STR0 and all sectors (data sectors) SC of the second track STR1 are each target sectors RSC. The write processing for the first track STR0 is executed ideally without any positioning error PE (PE≈0 or PE=0).

If the magnetic disk device 1 is affected by external vibration or other factors during the write processing, a positioning error PE will occur when positioning the write head WHD. The positioning error PE is the amount of deviation of the write head WHD from the target position in the radial direction d1. By setting a track margin TM, it is possible to determine an allowable range in which it is guaranteed that data on an adjacent track can be read.

For example, in a case where the write processing is executed on the second track STR1, and target sectors RSCe, RSC (e+1), and RSC (e+2) of the first track STR0 are adjacent to the write head WHD in the radial direction d1 during a period in which the positioning error PE exceeds the track margin TM, it is determined (predicted) that the data in target sectors RSCe, RSC (e+1), and RSC (e+2) of the first track STR0 is damaged. Although a lower BER is preferable, the BER of the data in target sectors RSCe, RSC (e+1), and RSC (e+2) of the first track STR0 exceeds a threshold BERTH. Note that, as can be seen from the graph on the right side of FIG. 10, the greater the positioning error PE, the greater the adverse effect of adjacent track interference (ATI), and the BER of the data in the first track STR0, which is excessively affected by ATI, becomes excessively high.

Therefore, among the plurality of target sectors RSC of the first track STR0, target sectors RSCe, RSC (e+1), and RSC (e+2) are determined as damaged target sectors CSC1, CSC2, and CSC3. This can cause the quality of signals obtained by reading the data of the damaged target sectors CSC1 to CSC3 to deteriorate, or the data of the damaged target sectors CSC1 to CSC3 to be erased.

In the example explained using FIG. 10, the magnetic disk device 1 does not have a function that executes track-by-track error correction for the data in track TR. Here, track-by-track error correction is also referred to as track-based error correction or track error correction code (ECC), etc. Therefore, target sectors RSCe, RSC (e+1), and RSC (e+2) remain as damaged target sectors CSC1, CSC2, and CSC3.

Here, in FIG. 10, it is assumed that all target sectors RSC of track TR have a common track margin TM. In the explanations of FIG. 11 and FIG. 12 below, it is also assumed that all target sectors RSC of track TR have a common track margin TM. However, the above track margin TM setting is only an example, and the track margin TM may be different for each target sector RSC.

FIG. 11 is a schematic view showing an example of the first track STR0 and the second track STR1 in a case where it is assumed that the magnetic disk device 1 does not have a function to execute track-by-track error correction for data of the track TR, and illustrates write processing for the first track STR0 and the second track STR1, as well as a state in which a judgment value is set to a write-off track slice WOS that is smaller (stricter) than the track margin TM, and write processing for the second track STR1 is suspended when it is detected that the positioning error PE has reached or exceeded the write-off track slice WOS, and shows changes in BER for the first track STR0 and changes in BER for positioning errors PE, respectively, by a graph. Also, in FIG. 11, for convenience of explanation, the first track STR0, etc. are depicted as being linear in the circumferential direction. In the explanation using FIG. 11, the magnetic disk device 1 is explained as not comprising the error correction unit 64 of FIG. 1.

As shown in FIG. 11, the first track STR0 and the second track STR1 are each data tracks, and all sectors SC of the first track STR0 and all sectors (data sectors) SC of the second track STR1 are each target sectors RSC. The write processing for the first track STR0 is executed ideally without any positioning error PE (PE≈0 or PE=0).

In order to prevent or suppress write processing in a state where the positioning error PE exceeds the track margin TM, the magnetic disk device 1 has a write-off track slice WOS. When it is determined that the positioning error PE exceeds the write-off track slice WOS during a period in which data is being written to the second track STR1, the writing of data to the second track STR1 can be suspended. Of the plurality of target sectors RSC in the second track STR1, the remaining target sectors RSC for which writing of data has been postponed become empty sectors ESC to which no data has been written. By avoiding a situation where the positioning error PE exceeds the track margin TM, it is possible to prevent the occurrence of damaged target sectors CSC on the first track STR0.

Note that, the track STR has a servo sector in addition to the sector SC which is the data sector. In the track STR, the data sector and the servo sector are generally arranged alternately. The write head WHD can derive the positioning error PE together with the servo sector. Therefore, the positioning error PE is generally information obtained intermittently.

In order to prevent PE>TM, it is necessary to set the write-off track slice WOS to become WOS≤TM. In order to avoid a situation where PE>TM, it is preferable to set the write-off track slice WOS to become WOS<TM. This allows the write processing for the second track STR1 to be suspended before the positioning error PE exceeds the track margin TM, and avoids a situation where the quality of the data on the first track STR0 deteriorates.

However, it should be noted that the smaller the write-off track slice WOS is set, the more likely it is that write processing will be suspended, which will lead to a decrease in the write performance of the magnetic disk device 1. Note that, in the case of a magnetic disk device 1 that does not have the function to execute track-by-track error correction, when the write processing for the second track STR1 is suspended, write retry processing, which waits for the disk DK to rotate until PE≤WOS, and then resumes the write processing for the second track STR1, is executed. In the write retry processing, the empty sector ESC of the second track STR1 can be changed to a recorded sector USC; therefore, a situation where the utilization efficiency of the second track STR1 remains low can be avoided.

Here, in FIG. 11, it is explained that all target sectors RSC of track TR have a common write-off track slice WOS. In the explanation of FIG. 12 below, it is also assumed that all target sectors RSC of track TR have a common write-off track slice WOS. However, the above setting of the write-off track slice WOS is an example, and the write-off track slice WOS may be different for each target sector RSC.

FIG. 12 is a schematic view showing an example of the first track STR0 and the second track STR1 of the magnetic disk device 1 that has a function for executing track-by-track error correction for data of the track TR, and illustrates write processing for the first track STR0 and second track STR1, as well as a state in which a judgment value is set to a write-off track slice WOS that is larger (looser) than the track margin TM, and the write processing for the second track STR1 is continued until a track-by-track error correction for the first track STR0 reaches its limit, and shows changes in BER for the first track STR0 and changes in BER for positioning errors PE, respectively, by a graph. Also, in FIG. 12, for convenience of explanation, the first track STR0, etc. are depicted as being linear in the circumferential direction.

As shown in FIG. 12, the write processing for the first track STR0 is executed ideally without any positioning error PE (PE≈0 or PE=0).

The magnetic disk device 1 comprises the error correction unit 64. In a case where a damaged target sector CSC occurs in track ST, the read processing unit 63 can detect, together with the head amplifier IC 130, that a damaged target sector CSC has occurred in track ST, and the error correction unit 64 can execute error correction processing to recover the data of the damaged target sector CSC. For example, in a case where a damaged target sector CSC occurs in the first track STR0, the error correction unit 64 recovers the data of the damaged target sector CSC based on data of a plurality of target sectors RSC of the first track STR0 and data of a parity sector.

The above-mentioned parity sector is generated based on the data of the plurality of target sectors RSC of the first track STR0, and can be provided in part of the plurality of target sectors RSC of the first track STR0. For example, one or two target sectors RSC of the first track STR0 can be used as parity sectors. However, the above-mentioned parity sector may be provided in a track TR other than the first track STR0. Alternatively, the above-mentioned parity sector may be provided in a memory other than a disk (e.g., the nonvolatile memory 90).

As described above, even if a damaged target sector CSC occurs in the first track STR0, since the error correction unit 64 can execute an error correction processing to recover the data of the damaged target sector Csc, it is possible to allow the damaged target sector CSC to occur in the first track STR0. In the magnetic disk device 1 that comprises the error correction unit 64, the write-off track slice WOS can be set to become WOS≥TM, making it difficult for the write processing to end and suppressing deterioration of the write performance of the magnetic disk device 1.

It should be noted that there is an upper limit, in units of tracks TR, on the number of damaged target sectors for which the error correction unit 64 can execute track-by-track error correction. For example, in a case where the number of damaged target sectors CSC in the first track STR0 exceeds the upper limit (e.g., five), it will be difficult for the error correction unit 64 to recover the data of all damaged target sectors CSC.

FIG. 13 is a schematic view showing an example of changes in track ECC Gain with respect to squeeze counts. FIG. 13 is shown in Patent Literature 1 (JP 2023-119547 A). As shown in FIG. 13, the horizontal axis labeled "squeeze count" represents the number of damaged target sectors that have been squeezed (collated) within the same track, and the vertical axis labeled "Track ECC Gain" represents the upper limit of an error metric value, which is a measure to predict the quality of the damaged target sectors. The vertical axis corresponds to BER of the damaged target sector, and the closer it is to "large", the worse (larger) the BER and the more difficult it is to read the data.

Here, the error metric value is the excess amount protruding from a reference radial position when squeezing is performed from an adjacent track.

The reference radial position is an adjacent track squeeze position where the BER when the target sector on the target track is read is a threshold BERth (e.g., BERth=−1.7), which is the correction limit value of the sector ECC. Note that the BER is conventionally expressed in terms of a common logarithm ($\log_{10}$). For example, in a case of an error rate of 1 bit out of 100 bits, the BER=$\log_{10}$ (1/100)=−2.0.

In a case where the track ECC is not used, it is not possible to write data from an adjacent track beyond this reference radial position, and therefore, it is necessary to widen the track pitch accordingly. In other words, the vertical axis in FIG. 13 shows a track per inch (TPI) improvement effect by the track ECC. When the number of damaged target sectors is small (the squeeze count is small), the average error metric value is large, and data from sectors that are expected to be more damaged can be saved. On the other hand, when the number of damaged target sectors is large, the average error metric value is small, and it can be seen that only data from sectors that are expected to be less damaged can be saved.

FIG. 14 is a block diagram showing an example of a head HD positioning control system SY and the correction limit prediction unit 65. FIG. 14 is a block diagram based on the configuration disclosed in the above-mentioned patent literature 1.

As shown in FIG. 14, the magnetic disk device 1 has the head HD positioning control system SY. The positioning control system SY comprises a transducer (physical target transducer for writing) TD, a subtracter SU1, a controller CL, and an actuator P.

The transducer TD, the subtracter SU1, and the controller CL are included in, for example, the head amplifier IC 130 and the system controller 110. The actuator P is configured by, for example, the arm 30 and the VCM 24. The subtracter SU1, the controller CL, and the actuator P configure a feedback system.

The host 100 instructs the magnetic disk device 1 of the address (C, H, S) of the sector to be written. Here, with respect to the sector to be written, C is a track number (cylinder number), H is a head number, and S is a sector number. The transducer TD then converts the above address to a distance R corresponding to the track number C and outputs it. The information on the distance R is input to the subtracter SU1.

A physical radial position Yr of the head HD can be obtained by reading and demodulating servo information on the disk DK. The subtracter SU1 outputs a positioning error PE, which is information obtained by subtracting the distance R from the physical radial position Yr, to the controller CL (PE=Yr−R). In order to achieve stable positioning control at the controller CL, the controller CL can obtain a control amount U by applying gain compensation and phase compensation to the positioning error PE. Then, by driving the actuator P with the control amount U as the input, the head HD can be positioned to the write target position (radial position).

The correction limit prediction unit 65 comprises a subtracter SU2, an integrator Sum, a comparator AM1, a counter COU, and a comparator AM2.

The subtracter SU2 outputs an excess amount OVR, which is information obtained by subtracting the track margin TM from the positioning error PE (OVR=PE−TM). When the excess amount OVR is a positive value, the comparator AM1 outputs an error signal Err to indicate that a damaged target sector has occurred. The excess amount OVR is input to the integrator Sum as a metric value (error metric value) Mer. When the error signal Err is input to the integrator Sum, the integrator Sum adds the input metric value Mer and updates a cumulative metric value ME, which is the cumulative total of the metric value Mer.

Meanwhile, the error signal Err is input to the counter COU, and the counter COU counts up the number of damaged target sectors, outputs information ErrC of the cumulative number of damaged target sectors, and refers to a table SLT recorded in a memory such as the nonvolatile memory 90. The table SLT has information on the cumulative upper limit threshold value CU, which is a variable. The cumulative upper limit threshold value CU corresponding to the information ErrC is selected from the table SLT, and the selected cumulative upper limit threshold value CU is input to the comparator AM2 together with the cumulative metric value ME.

The comparator AM2 can generate prediction information PI, which is information that predicts whether or not error correction for the data track adjacent to the current write target data track will reach its limit. In a case where the prediction information PI is a positive value (the cumulative metric value ME exceeds the cumulative upper limit threshold value CU), it can be predicted that the correction based on the track ECC will reach its limit, and the determination unit 66 can make a decision to end the write processing for the current write target data track.

Incidentally, the metric value Mer shown in FIG. 14 is the excess amount OVR, and does not directly represent the amount of damage corresponding to the correction capability of the track ECC. This is because the metric value Mer is the degree of damage to the data in the adjacent data track estimated from the positioning error PE, etc., and the actual degree of damage cannot be known until the data in the adjacent data track is read.

Here, FIG. 15 is a graph exemplifying changes in a plurality of identical upper limit excess amounts OL and changes in the cumulative upper limit threshold values CU, respectively, with respect to the number of damaged target sectors N in the first track STR0. Note that the upper limit excess amount OL is the upper limit of the excess amount OVR.

As shown in FIG. 15, the cumulative upper limit threshold value CU can be derived from the number of damaged target sectors N and the upper limit excess amount OL. For example, in a case where the number of damaged target sectors within one data track is two, data correction for the two damaged target sectors is possible if the excess amount OVR per damaged target sector is up to 6.8 nm (the cumulative upper limit threshold value CU is up to 13.6 nm).

On the other hand, in a case where the number of damaged target sectors N within one data track is 10, data correction for the 10 damaged target sectors is possible if the excess amount OVR per damaged target sector is up to 2.7 nm (cumulative upper limit threshold value CU is up to 27.0 nm). It can be seen that the allowable upper limit excess amount OL decreases as the number of damaged target sectors N increases.

Ideally, the total amount of data damage in the damaged target sectors that is allowable should be constant regardless of the number of damaged target sectors.

As shown in FIG. 15, however, the data (graph) shows that when the number of damaged target sectors N is small, the cumulative upper limit threshold value CU is small, and as the number of damaged target sectors N increases, the cumulative upper limit threshold value CU increases. In the case of using such data, when a damaged target sector with a large excess amount OVR occurs in the middle of a process after a damaged target sector with a series of smaller excess amount OVR occurs in the first half of the process in the adjacent data track during the write processing to the data track, it is possible that a situation will occur where the original correction limit judgement will not be applied. This may lead to a situation where the write processing to the data track is allowed to continue to a degree that exceeds the correction capability of the track ECC.

The reason why the above situation may occur is because the cumulative upper limit threshold value CU is proportional to the excess amount OVR (positioning error PE). In other words, as can be seen from FIG. 12, etc., the BER that exceeds the track margin TM is not proportional to the positioning error PE. That is, based on the characteristics of the BER in FIG. 12, etc., if the BER for the excess amount OVR of 2 nm is assumed to be "1", the BER for the excess amount OVR of 3 nm is not "1.5", but rather "a value exceeding 1.5".

From the above, the inventors of the present application came up with the idea and realized that it is desirable to assign weights to the larger excess amount OVR in order to correspond to the BER characteristics, since this makes it easier to apply the original correction limit judgment. The above-mentioned weighting, etc., will be described later.

FIG. 16 is a graph exemplifying the cumulative value of the number of damaged target sectors N in the first track STR0 and the excess amount OVR of each damaged target sector. Note that, in FIG. 16, the horizontal axis indicates the order in which the damaged target sectors occur. For example, the excess amount OVR at position N=5 is a value when the damaged target sector occurs for the fifth time.

Here, for example, a case is considered in which the damaged target sectors that occurred from the first time to the fourth time were all due to an excess amount OVR of 1 nm, and the damaged target sectors that occurred from the fifth time and after were all due to an excess amount OVR of 6 nm.

FIG. 17 is a graph exemplifying changes in the cumulative metric value ME with respect to the number of damaged target sectors N in the first track STR0, together with a graph showing changes in the cumulative upper limit threshold value CU shown in FIG. 15. In FIG. 17, the cumulative metric value ME is based on the data in FIG. 16.

As shown in FIG. 17, the cumulative metric value ME exceeds the cumulative upper limit threshold value CU, and the prediction information PI becomes a positive value at the eighth time of predicting the occurrence of the damaged target sector. However, the excess amount OVR from the fifth to the seventh times of predicting the occurrence of the damaged target sector is 6 nm for three consecutive times. On the other hand, based on FIG. 15, in a case where there are three damaged target sectors, the upper limit excess amount OL is 5.3 nm, and the above-mentioned 6 nm cannot be allowed.

Therefore, based on FIG. 15 and FIG. 16, it can be seen that, unlike FIG. 17, it is preferable for the determination unit 66 to decide to end the write processing to the data track when the occurrence of the damaged target sector is predicted for the seventh time. However, in the example of FIG. 17, the continuation of the write processing in which the seventh damaged target sector may occur is permitted. Therefore, the determination unit 66 allows the write processing to the data track to an extent that it exceeds the correction capability of the track ECC.

The reason why the timing for ending the write processing is inappropriate is because the above-mentioned weighting concept was not considered. As described above, the inventors of the present invention conceived that it was necessary to give weight to the excess amount OVR in order to solve the above-described problem. For example, the inventors of the present invention conceived that the greater the excess amount OVR (the greater the degree of damage), the more necessary it is to give weight to the excess amount OVR. This enables the magnetic disk device 1 to accurately judge the correction limit based on the track ECC.

Next, the write processing method according to the present embodiment is explained together with the configuration of the magnetic disk device 1. FIG. 18 is a block diagram showing an example of the head positioning control system and the correction limit prediction unit according to the present embodiment.

As shown in FIG. 18, FIG. 1, and FIG. 12, the magnetic disk device 1 has the head HD positioning control system SY. The positioning control system SY shown in FIG. 18 is the same as the positioning control system SY shown in FIG. 14.

The write processing unit 62 can select the shingled magnetic recording type in which data of the first track STR0 is written over data of the second track STR1 in the overwrite direction d5 parallel to the radial direction d1 of the disk DK.

Here, in the direction parallel to the radial direction d1 of disk DK, the first track STR0 is located in a first direction Da as seen from the second track STR1. Here, the first direction Da coincides with the radial direction d1; however, may also be an opposite direction of the radial direction d1. In the first direction Da, a position away from the position where the positioning error PE is 0 by the track margin TM is set as a reference radial position PTM. During the above-mentioned write period, when the position of the write head WHD protrudes in the first direction Da from the reference radial position PTM, the correction limit prediction unit 65 can determine that the target sector RSC adjacent to the write head WHD in the first direction Da among a plurality of target sectors RSC of the first track STR0 is a damaged target sector CSC.

The error correction unit 64 can execute error correction of the data of one or more damaged target sectors CSC that have been determined to have damaged data among the plurality of target sectors RSC of the first track STR0.

The correction limit prediction unit 65, unlike FIG. 14, does not have a counter COU, but it does have a variable gain amplifier AM3.

Here, attention is focused on a write period in which write processing is executed on a plurality of target sectors RSC in the first track STR0, and then on a plurality of target sectors RSC in the second track STR1.

First, the correction limit prediction unit 65 calculates the excess amount OVR by which the position of the write head (first write head) WHD has protruded from the reference radial position (first reference radial position) PTM in the first direction Da each time data is written to each target sector RSC of the second track STR1. In the present embodiment, the subtracter SU2 outputs the excess amount OVR, which is information obtained by subtracting the track margin TM from the positioning error PE (OVR=PE−TM).

Then, the correction limit prediction unit 65 calculates the metric value Mer by multiplying a first weight coefficient W1, which is a variable whose value changes in accordance with the excess amount OVR, by the excess amount OVR each time the position of the write head WHD exceeds the reference radial position PTM. In the present embodiment, the variable gain amplifier AM3 is configured so that the gain changes in accordance with the input excess amount OVR, and it can output a signal for the metric value Mer (Mer=O×W1).

Next, the correction limit prediction unit 65 updates the cumulative metric value ME, which is the cumulative total of the metric values Mer during the write period. In the present embodiment, when the excess amount OVR is a positive value, the comparator AM1 outputs an error signal Err indicating that a damaged target sector has occurred. The metric value (error metric value) Mer is output from the variable gain amplifier AM3 and input to the integrator Sum. When the error signal Err is input to the integrator Sum, the integrator Sum adds the input metric value Mer and updates the cumulative metric value ME.

Subsequently, the correction limit prediction unit 65 generates prediction information (first prediction information) PI, which is information that predicts whether or not error correction for the first track STR0 will reach its limit based on the cumulative metric value ME, before the write processing for all target sectors RSC of the second track STR1 is completed. In the present embodiment, a signal (value) indicating the cumulative metric value ME is input to one of the input terminals of the comparator AM2 from the integrator Sum. A value input to the other input terminal of the comparator AM2 is a reference value that is fixed. Here, the reference value is a fixed value because it indicates a specific reference value RV, which is a constant. In a case where the prediction information PI output by the comparator AM2 is a positive value (cumulative metric value ME exceeds specific reference value RV), it can be predicted that the correction based on the track ECC will reach its limit.

The determination unit 66 can determine whether or not to allow the write processing unit 62 to continue the write processing for second track STR1 based on the prediction information PI.

Therefore, it is possible to obtain a magnetic disk device 1 that can predict whether or not the error correction for the first track STR0 of disk DK will reach its limit.

The metric value Mer shown in FIG. 18 is the value obtained by multiplying the excess amount OVR by the first weight coefficient W1, and it generally represents the amount of damage corresponding to the correction capability of the track ECC. Therefore, the magnetic disk device 1 can more accurately judge the correction limit based on the track ECC.

In the magnetic disk device 1, by providing an option of continuing the write processing, it is possible to suppress a decrease in the write performance of the magnetic disk device 1. Furthermore, since the magnetic disk device 1 has an option of ending the write processing, excessive damage to the data in the first track STR0 can be avoided in advance, and a situation in which the amount of damaged data in the first track STR0 exceeds a limit can be avoided.

The correction limit prediction unit 65 can predict the correction limit of the track ECC based on the specific reference value RV. In a case where the correction limit prediction unit 65 predicts that the cumulative metric value ME will not reach the specific reference value RV, the prediction information PI indicates normal information predicting that error correction will not reach the limit. On the other hand, in a case where the correction limit prediction unit 65 predicts that the cumulative metric value ME will reach the specific reference value RV, the prediction information PI indicates abnormal information that predicts that error correction will reach its limit.

The switching unit 67 can be set to an effective mode that allows the error correction unit 64 to perform a track-by-track error correction mode. In a case where the prediction information PI indicates normal information during the above-mentioned write period, the switching unit 67 can set the error correction mode to an effective mode, and the determination unit 66 can cause the write processing unit 62 to continue the write processing for the second track STR1. For example, in a case where the magnetic disk device 1 is not in a state of vibration, the determination unit 66 can make a decision to allow the write processing unit 62 to continue the write processing.

The switching unit 67 can switch the track-by-track error correction mode to the above-mentioned effective mode or an invalid mode, which makes the error correction mode invalid. In a case where the prediction information PI changes to abnormal information during the above-mentioned write period, the switching unit 67 switches the error correction mode to the invalid mode, and the determination unit 66 can cause the write processing unit 62 to end the write processing for the second track STR1.

The above-mentioned specific reference value RV is a positive value. In that case, the excess amount OVR becomes larger as the position of the write head WHD protrudes from the reference radial position PTM in the first direction Da. It is also preferable that the first weight coefficient W1 increases monotonically so that the first weight coefficient W1 increases as the excess amount OVR increases. As can be seen from FIG. 12 described above, this is because when the positioning error PE exceeds the track margin TM, the BER increases quadratically. The above-mentioned weighting is necessary because the BER does not increase linearly, and if the weighting is not applied, the evaluation cannot be performed physically correctly.

The first weight coefficient W1 is a linear function of the excess amount OVR. However, the first weight coefficient W1 is not limited to a linear function of the excess amount OVR, and can be varied in various ways, as long as it monotonically increases. For example, the first weight coefficient W1 can be a quadratic function of the excess amount OVR.

For example, first information indicating the correspondence between the excess amount OVR and the first weight coefficient W1 may be recorded in the nonvolatile memory 90 as a memory unit of the magnetic disk device 1. In a case of deriving the first weight coefficient W1, the correction limit prediction unit 65 can derive the first weight coefficient W1 corresponding to the calculated excess amount OVR based on the above-mentioned first information recorded in the nonvolatile memory 90.

Note that, as can be seen from the above, the value of the first weight coefficient W1 in a case where the excess amount OVR is 6 nm is different from the value of the first weight coefficient W1 in a case where the excess amount OVR is 4 nm. More specifically, the value of the first weight coefficient W1 in the case where the excess amount OVR is 6 nm is greater than the value of the first weight coefficient W1 in the case where the excess amount OVR is 4 nm.

Next, the relationship between the number of damaged target sectors N, the first weight coefficient W1, the upper limit excess amount OL, the cumulative upper limit threshold value CU, etc. will be described.

In a case where a case in which the determination unit 66 determines that Nr damaged target sectors CSC have occurred in the first track STR0 in the write processing for the second track STR1 is defined as a reference case, the following applies, respectively.

Upper limit excess amount: OL(Nr)
First weight coefficient: W1(Nr)
W1(Nr)=1
Cumulative upper limit threshold value: CU(Nr)
Cumulative metric value: ME(Nr)
W1(Nr)=CU(Nr)/ME(Nr)=1
In this case,
W1(Nr)×OL(Nr)×Nr=W1(Nr)×CU(Nr)=specific reference value RV.

Next, in a case where a case in which the determination unit 66 determines that N1 damaged target sectors CSC have occurred in the first track STR0 in the write processing for the second track STR1 is defined as a target case, the following applies, respectively.

Upper limit excess amount: OL(N1)
First weight coefficient: W1(N1)
Cumulative upper limit threshold value: CU(N1)
Cumulative metric value: ME(N1)
W1(N1)=CU(N1)/ME(N1)
In this case, W1(N1)×OL(N1)×N1=W1(N1)×CU(N1) =above-mentioned specific reference value RV.
From the above,
W1(N1)=CU(Nr)/CU(N1).

By determining the reference first weight coefficient W1(Nr), which is one, it is possible to determine not only the reference number Nr of damaged target sectors CSC, but also the reference upper limit excess amount OL(Nr).

Also, as mentioned above,
W1(Nr)×OL(Nr)×Nr=W1(Nr)×CU(Nr), and
W1(Nr)=1, result in
CU(Nr)=OL(Nr)×Nr.

Next, a case in which the upper limit excess amount OL(N1) is larger than a reference upper limit excess amount OL(Nr) is assumed.

In a case where the excess amount OVR becomes the upper limit excess amount OL(N1), and the determination unit 66 determines that one damaged target sector CSC has occurred in the first track STR0 in the write processing for the second track STR1, where OL(N1)>OL(Nr), the correction limit prediction unit 65 processes as follows.

That is, the correction limit prediction unit 65 calculates the upper limit excess amount OL(N1), which is the excess amount OVR, calculates the metric value Mer(N1) by multiplying the first weight coefficient W1(N1) by the upper limit excess amount OL(N1), and updates the cumulative metric value ME(N1).

In this case,
W1(N1)>W1(Nr) and
CU(N1)<CU(Nr).

Next, a case where the upper limit excess amount OL(N1) is smaller than the reference upper limit excess amount OL(Nr) is assumed.

In a case where the excess amount OVR becomes the upper limit excess amount OL(N1), and the determination unit 66 determines that one damaged target sector CSC has occurred in the first track STR0 in the write processing for the second track STR1, where OL(N1)<OL(Nr), the correction limit prediction unit 65 processes as follows.

That is, the correction limit prediction unit 65 calculates the upper limit excess amount OL(N1), which is the excess amount OVR, calculates the metric value Mer(N1) by multiplying the first weight coefficient W1(N1) by the upper limit excess amount OL(N1), and updates the cumulative metric value ME(N1).

In this case,
0<W1(N1)<W1(Nr) and
CU(N1)>CU(Nr).

Next, the relationship between the excess amount OVR and the first weight coefficient W1 is described. FIG. 19 is a graph showing changes in the first weight coefficient W1 with respect to the excess amount OVR. FIG. 19 is based on an example where the number of damaged target sectors CSC of the correction limit of the first track STR0 is 10 (Nr=10).

Here, based on FIG. 15, in the case where the number N of damaged target sectors CSC is 10, the upper limit excess amount OL is 2.66 nm.

On the other hand, as shown in FIG. 19, in a case where the excess amount OVR is 2.66 nm, it can be seen that the first weight coefficient W1(Nr) is 1.0. If the first weight coefficient W1 is y and the excess amount OVR is x, then the first weight coefficient W1 can be approximated by a linear function, with y=0.24×x+0.36. Therefore, as described above, the first weight coefficient W1 can be recorded in a memory unit such as the nonvolatile memory 90 as a function.

Also, with reference to FIG. 19, in a case where the excess amount OVR is 4 nm, it can be seen that N1=5, and the first weight coefficient W1(N1) is approximately 1.3. This value of 1.3 can be calculated based on FIG. 15 and the following equation described above.
W1(N1)=CU(Nr)/CU(N1)
Nr=10
N1=5

Based on FIG. 15, CU(10)=26.6 nm and CU(5)=20 nm; therefore, W1(5)=CU(10)/CU(5)=26.6 nm/20 nm≈1.3, and the first weight coefficient W1(5) of 1.3 can approximately be calculated.

Next, the average value of the metric value Mer and the cumulative metric value ME calculated using the correction limit prediction unit 65 of FIG. 14 and the average value of the metric value Mer and cumulative metric value ME calculated using the correction limit prediction unit 65 of FIG. 18 (the present embodiment) will be compared and described.

FIG. 20 is a graph exemplifying two types of changes in the average value of the metric value Mer with respect to the number of damaged target sectors CSC. FIG. 21 is a graph exemplifying two types of changes in the upper limit value of the cumulative metric value ME with respect to the number of damaged target sectors CSC.

As shown in FIG. 20, in contrast to the correction limit prediction method of FIG. 14 which does not use a weight coefficient, in the correction limit prediction method of the present embodiment of FIG. 18 which uses a weight coefficient, the metric value Mer is weighted more as the excess amount OVR increases.

As shown in FIG. 21, and in the correction limit prediction method of the present embodiment shown in FIG. 18, it can be seen that the upper limit value of the cumulative metric value ME is 26.63 nm regardless of the number of damaged target sectors CSC. That is, it can be seen that the above-mentioned specific reference value RV should be set (fixed) to 26.63 nm.

Next, the metric value Mer calculated using the correction limit prediction unit 65 of FIG. 14 and the metric value Mer calculated using the correction limit prediction unit 65 of FIG. 18 (the present embodiment) will be compared and described. FIG. 22 is a graph exemplifying two types of cumulative values of the number of damaged target sectors CSC in the first track STR0 and each of the metric values Mer.

In FIG. 22, as in FIG. 16, the horizontal axis indicates the order in which the damaged target sectors occur. A case where the damaged target sectors CSC that occurred from the first time to the fourth time were all due to an excess amount OVR of 1 nm, and the damaged target sectors CSC that occurred from the fifth time and thereafter were all due to an excess amount OVR of 6 nm is considered.

As shown in FIG. 22, in the correction limit prediction method of the present embodiment shown in FIG. 18, in a case where the excess amount OVR is 1 nm, the first weight coefficient W1 becomes a positive value less than 1.0; therefore, the metric value Mer can be set to a value less than 1 nm. Similarly, in a case where the excess amount OVR is 6 nm, the first weight coefficient W1 becomes a value greater than 1.0; therefore, the metric value Mer can be set to a value greater than 6 nm. Based on FIG. 19, in the case where the excess amount OVR is 6 nm, a preferable value for the first weight coefficient W1 becomes 1.8; therefore, when calculating the metric value Mer, it becomes Mer=W1× OVR=1.8×6 nm=10.8 nm.

Next, the cumulative metric value ME calculated using the correction limit prediction unit 65 of FIG. 18 (the present embodiment) will be described. FIG. 23 is a graph exemplifying changes in the cumulative metric value ME with respect to the number of damaged target sectors CSC in the first track STR0, together with a graph in which the upper limit value of the cumulative metric value ME (specific reference value RV) shown in FIG. 21 is constant. Note that, in FIG. 23, the cumulative metric value ME is based on the data for the present embodiment in FIG. 22.

As shown in FIG. 23 and FIG. 19 to FIG. 22, the damaged target sectors that occurred from the first time to the fourth time were all due to the excess amount OVR of 1 nm, and the damaged target sectors that occurred from the fifth time and thereafter were all due to the excess amount OVR of 6 nm.

Based on FIG. 19, in the case where the excess amount OVR is 1 nm, a preferable value for the first weight coefficient W1 becomes 0.6; therefore, when calculating the metric value Mer, it becomes Mer=W1×OVR=0.6×1 nm=0.6 nm.

At a point when it is predicted that the first four damaged target sectors CSC will occur, the cumulative metric value ME is updated to ME=0.6 nm+0.6 nm+0.6 nm+0.6 nm=2.4 nm.

Subsequently, at a point when the fifth and sixth damaged target sectors CSC are predicted to occur, the cumulative metric value ME is updated to ME=2.4 nm+10.8 nm+10.8 nm=24.0 nm.

If the cumulative metric value ME is 24.0 nm, the cumulative metric value ME is equal to or less than the specific reference value RV (26.63 nm); therefore, the determination unit 66 can allow the write processing that will result in the occurrence of the sixth damaged target sector CSC.

Further thereafter, when it is predicted that the seventh damaged target sector CSC will occur, the cumulative metric value ME is updated to ME=24.0 nm+10.8 nm=34.8 nm.

If the cumulative metric value ME reaches 34.8 nm, the cumulative metric value ME exceeds the specific reference value RV (26.63 nm); therefore, the determination unit 66 can prohibit the write processing that will result in the occurrence of the seventh damaged target sector CSC and end the write processing.

Here, referring to FIG. 15, in a case where the number N of damaged target sectors CSC is two, the upper limit excess amount OL(2) is 6.7 nm; therefore, the determination unit 66 can allow the damaged target sectors CSC caused by the excess amount OVR of 6 nm to occur twice, and can allow the write processing that will result in the occurrence of the sixth damaged target sector CSC.

On the other hand, in a case where the number N of damaged target sectors CSC is three, the upper limit excess amount OL(3) is 5.4 nm; therefore, the determination unit 66 can prohibit the damaged target sectors CSC caused by an excess amount OVR of 6 nm to occur three times, and can prohibit the write processing that results in the occurrence of the seventh damaged target sector CSC.

As described above, the correction limit prediction method of the magnetic disk device 1 of the present embodiment can perform judgment of the correction limit by the track ECC more accurately.

According to the magnetic disk device 1, the write processing method, and the correction limit prediction method of the first embodiment configured in the manner described above, the magnetic disk device 1 comprises the disk DK, the write head WHD, the write processing unit 62, the error correction unit 64, the correction limit prediction unit 65, and the determination unit 66.

During the write period, the correction limit prediction unit 65:

calculates the excess amount OVR each time data is written to each target sector RSC of the second track STR1;

calculates the metric value Mer by multiplying the first weight coefficient W1 by the excess amount OVR each time the write head WHD position exceeds the reference radial position PTM; and updates the cumulative metric value ME, and generates the prediction information PI before completing the write processing to all target sectors RSC of the second track STR1.

The determination unit 66 can determine whether or not to allow the write processing unit 62 to continue the write processing to the second track STR1 based on the prediction information PI.

As a result, a magnetic disk device 1 can be obtained that can predict whether or not the error correction for the data tracks on the disk DK will reach its limit. Then, before the damaged amount of data on the first track STR0 exceeds the limit (specific reference value RV), the determination unit 66 can determine whether to continue or to end the write processing for the second track STR1.

Second Embodiment

Next, a second embodiment will be described. A magnetic disk device 1 is configured in the same manner as the magnetic disk device 1 of the first embodiment described above, except for the configurations described in this second embodiment. A write processing method and a correction limit prediction method are the same as the procedures of the write processing method and the correction limit prediction method of the first embodiment described above, except for the procedures described in this second embodiment.

FIG. 24 is a schematic view showing an example of a third track STRα0 and a fourth track STRα1 of the magnetic disk device 1 according to this second embodiment, which illustrates write processing for the third track STRα0 and the fourth track STRα1, in which a judgment value is set to a write-off track slice WOS that is larger (looser) than a track margin TM, and illustrates a state in which the write processing for the fourth track STRα1 is continued until a track-by-track error correction for the third track STRα0 reaches its limit, and shows changes in BER for the third track STRα0 and changes in BER for positioning errors PE, respectively, by a graph. In FIG. 24, for convenience of explanation, the third track STRα0, etc., are depicted as being linear in the circumferential direction.

As shown in FIG. 24, the write processing for the third track STRα0 is ideally executed without any positioning error PE (PE≈0 or PE=0).

In the present embodiment, a weight coefficient W is adjustable for each zone Z of a recording layer L of a disk DK.

The recording layer L of the disk DK has a zone (first zone) Ze that includes a first track STR0 and a second track STR1, and a zone (second zone) Zex that includes the third track STRα0 and the fourth track STRα1. The third track STRα0 and the fourth track STRa1 are adjacent to each other and each includes a plurality of target sectors RSC. The third track STRα0 is located in a second direction Db, which is parallel to a radial direction d1 as viewed from the fourth track STRα1. Here, the second direction Db coincides with the radial direction d1; however, may also be an opposite direction of the radial direction d1.

Here, attention is focused on a write period in which write processing is executed on a plurality of target sectors RSC in the third track STRα0, and then on a plurality of target sectors RSC in the fourth track STRα1.

First, a correction limit prediction unit 65 calculates an excess amount OVR by which the position of a write head (first write head) WHD protrudes from a second reference radial position PTM in the second direction Db each time data is written to each target sector RSC of the fourth track STRα1.

Then, the correction limit prediction unit 65 calculates a metric value Mer by multiplying a second weighting factor W2, which is a variable whose value changes in accordance with the excess amount OVR, by the excess amount OVR each time the position of the write head WHD exceeds the second reference radial position PTM.

Next, the correction limit prediction unit 65 updates a cumulative metric value ME, which is the cumulative total of the metric values Mer during the write period.

Subsequently, the correction limit prediction unit 65 generates second prediction information PI, which is information that predicts whether or not error correction for the third track STRα0 will reach its limit based on the cumulative metric value ME, before the write processing for all target sectors RSC of the fourth track STRα1 is completed.

A determination unit 66 can determine whether or not to allow a write processing unit 62 to continue the write processing for the fourth track STRα1 based on the second prediction information PI.

The magnetic disk device 1, the write processing method, and the correction limit prediction method according to the second embodiment configured in the manner described above can also achieve the same effects as the first embodiment described above.

The weight coefficient W can be adjusted for each zone Z of the recording layer L of the disk DK.

For example, a first weight coefficient W1 and the second weight coefficient W2 may be identical. In that case, the first weight coefficient W1 and the second weight coefficient W2 may be the data of the graph shown in FIG. 19.

Alternatively, the second weight coefficient W2 may be a different coefficient from the first weight coefficient W1.

This enables the correction limit to be judged even more accurately by the track ECC.

In this case, as a memory unit of the magnetic disk device 1, for example, a nonvolatile memory 90 may record first information indicating the correspondence between the excess amount OVR and the first weighting coefficient W1, and second information indicating the correspondence between the excess amount OVR and the second weighting coefficient W2.

As a result, during a write period in which write processing is executed for the second track STR1, the correction limit prediction unit 65 can derive the first weight coefficient W1 corresponding to the calculated excess amount OVR based on the above-mentioned first information stored in the nonvolatile memory 90.

In addition, during a write period in which write processing is executed for the fourth track STRα1, the correction limit prediction unit 65 can derive the second weight coefficient W2 corresponding to the calculated excess amount OVR based on the above-mentioned second information stored in the nonvolatile memory 90.

Modified Example 1 of Second Embodiment

Next, modified example 1 of the second embodiment will be described. A magnetic disk device 1 is configured in the same manner as the magnetic disk device 1 of the second embodiment described above, except for the configurations described in this modified example 1. A write processing method and a correction limit prediction method are the same as the procedures of the write processing method and the correction limit prediction method of the second embodiment described above, except for the procedures described in this modified example 1.

In this modified example 1, a weight coefficient W may be adjusted for each head HD, and not for each zone Z.

A second recording layer L of a second disk DK may have a third track STRα0 and a fourth track STRα1. A second write head WHD writes data to the second recording layer L.

A first disk DK with a first recording layer L (first track STR0 and second track STR1) and a second disk DK with the second recording layer L may be a same disk. In that case, the second recording layer L may be a recording layer on an opposite side of the first recording layer L. Alternatively, the first disk DK and the second disk DK may be different disks.

In this case, as shown in FIG. 2, for example, the first recording layer L is the first recording layer La1 of the disk DK1, and the second recording layer L is the second recording layer Lb2 of the disk DK2.

In this modified example 1, the same effect as the above-mentioned second embodiment can be obtained. In addition, the correction limit judgement by the track ECC can be performed more accurately for each head HD.

Modified Example 2 of Second Embodiment

Next, modified example 2 of the second embodiment will be described. A magnetic disk device 1 is configured in the same manner as the magnetic disk device 1 of the second embodiment described above, except for the configurations described in this modified example 2. A write processing method and a correction limit prediction method are the same as the procedures of the write processing method and the correction limit prediction method of the second embodiment described above, except for the procedures described in this modified example 2.

In this modified example 2, a weight coefficient W may be adjusted for each zone Z and for each head HD. In this modified example 2, the same effects as in the above-mentioned second embodiment and the above-mentioned modified example 1 can be obtained. In addition, the correction limit judgment using the track ECC can be performed more accurately for each head HD and each zone Z.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-mentioned technology may be applied not only to hybrid recording-type magnetic disk devices, but also to shingled magnetic recording-type magnetic disk devices and conventional magnetic recording-type magnetic disk devices.

What is claimed is:

1. A magnetic disk device comprising:
a first disk having a first data track and a second data track adjacent to each other in a first recording layer, wherein the first data track and the second data track each include a plurality of target sectors to which data is written, and the first data track is located in a first direction parallel to a radial direction of the first disk when viewed from the second data track;
a first write head that writes data to the first recording layer of the first disk;
a write processing unit that is capable of executing write processing to write data to the first recording layer;
an error correction unit that executes error correction of data in one or more damaged target sectors of the plurality of target sectors of the first data track that are determined to be damaged;
a correction limit prediction unit; and
a determination unit,
wherein
during a write period in which the write processing is executed for the plurality of target sectors of the second data track after the write processing is executed for the plurality of target sectors of the first data track,
the correction limit prediction unit
calculates an excess amount by which a position of the first write head protrudes from a first reference radial position in the first direction each time data is written to each of the target sectors of the second data track,
calculates a metric value by multiplying a first weight coefficient, which is a variable whose value changes in accordance with the excess amount, by the excess amount each time the position of the first write head exceeds the first reference radial position,
updates a cumulative metric value, which is a cumulative total of the metric values during the write period, and
generates first prediction information, which is information predicting whether or not the error correction for the first data track will reach its limit based on the cumulative metric value, before the write processing for all target sectors of the second data track is completed, and
the determination unit determines whether or not to allow the write processing unit to continue the write processing for the second data track based on the first prediction information.

2. The magnetic disk device of claim 1, wherein
in a case where the correction limit prediction unit predicts that the cumulative metric value will not reach a specific reference value that is a constant, the first prediction information indicates normal information that predicts that the error correction will not reach the limit, and
in a case where the correction limit prediction unit predicts that the cumulative metric value will reach the specific reference value, the first prediction information indicates abnormal information that predicts that the error correction will reach its limit.

3. The magnetic disk device of claim 2, further comprising:
a switching unit that can be set to an effective mode that enables a track-by-track error correction mode by the error correction unit,
wherein
in a case where the first prediction information indicates the normal information during the write period,
the switching unit sets the error correction mode to the effective mode, and
the determination unit causes the write processing unit to continue the write processing for the second data track.

4. The magnetic disk device of claim 3, wherein
the switching unit is capable of switching the error correction mode to the effective mode or an invalid mode, which makes the error correction mode invalid, and
in a case where the first prediction information is replaced by the abnormal information during the write period,
the switching unit switches the error correction mode to the invalid mode, and
the determination unit causes the write processing unit to end the write processing for the second data track.

5. The magnetic disk device of claim 2, wherein
the specific reference value is a positive value,
the excess amount becomes larger as the position of the first write head protrudes from the first reference radial position in the first direction, and
the first weight coefficient monotonically increases, and the first weight coefficient also increases as the excess amount increases.

6. The magnetic disk device of claim 5, wherein
the first weight coefficient is a linear function of the excess amount.

7. The magnetic disk device of claim 5, wherein
the first weight coefficient is a quadratic function of the excess amount.

8. The magnetic disk device of claim 5, further comprising:
a memory unit in which first information indicating a correspondence between the excess amount and the first weight coefficient is recorded,
wherein
in a case of deriving the first weight coefficient,
the correction limit prediction unit derives the first weight coefficient corresponding to the calculated excess amount based on the first information recorded in the memory unit.

9. The magnetic disk device of claim 1, wherein in a case where a case in which the determination unit judges that Nr damaged target sectors have occurred in the first data track in the write processing for the second data track is defined as a reference case, the following applies, respectively:

when an upper limit excess amount, which is an upper limit of the excess amount, is OL(Nr),
the first weight coefficient is W1(Nr),
W1(Nr)=1,
a cumulative upper limit threshold value is CU(Nr),
the cumulative metric value is ME(Nr), and
W1(Nr)=CU(Nr)/ME(Nr)=1,
W1(Nr)×OL(Nr)×Nr=W1(Nr)×CU(Nr)=a specific reference value, and in a case where a case in which the determination unit determines that N1 damaged target sectors have occurred in the first data track in the write processing for the second data track is defined as a target case, the following applies, respectively:

when the upper limit excess amount, which is an upper limit of the excess amount, is OL(N1),
the first weight coefficient is W1(N1),
a cumulative upper limit threshold value is CU(N1),
the cumulative metric value is ME(N1), and
W1(N1)=CU(N1)/ME(N1),
W1(N1)×OL(N1)×N1=W1(N1)×CU(N1)=the specific reference value, and
W1(N1)=CU(Nr)/CU(N1).

10. The magnetic disk device of claim 9, wherein CU(Nr)=OL(Nr)×Nr=the specific reference value.

11. The magnetic disk device of claim 9, wherein in the write processing for the second data track, in a case where the excess amount becomes the upper limit excess amount OL(N1), the determination unit determines that one damaged target sector has occurred in the first data track, and OL(N1)>OL(Nr), the correction limit prediction unit calculates the upper limit excess amount OL(N1), which is the excess amount, calculates the metric value by multiplying the first weight coefficient W1(N1) by the upper limit excess amount OL(N1), and updates the cumulative metric value ME(N1),
W1(N1)>W1(Nr), and
CU(N1)<CU(Nr).

12. The magnetic disk device of claim 9, wherein in the write processing for the second data track, in a case where the excess amount becomes the upper limit excess amount OL(N1), the determination unit determines that one damaged target sector has occurred in the first data track, and OL(N1)<OL(Nr), the correction limit prediction unit calculates the upper limit excess amount OL(N1), which is the excess amount, calculates the metric value ME(N1) by multiplying the first weight coefficient W1(N1) by the upper limit excess amount OL(N1), and updates the cumulative metric value ME(N1),
0<W1(N1)<W1(Nr), and
CU(N1)>CU(Nr).

13. The magnetic disk device of claim 1, wherein the first recording layer of the first disk has a first zone including the first data track and the second data track, and a second zone having a third data track and a fourth data track that are adjacent to each other, each including the plurality of target sectors, the third data track is located in a second direction parallel to the radial direction when viewed from the fourth data track, and during a write period in which the write processing is executed for the plurality of target sectors of the fourth data track after the write processing is executed for the plurality of target sectors of the third data track, the correction limit prediction unit calculates an excess amount by which a position of the first write head protrudes from a second reference radial position in the second direction each time data is written to each of the target sectors of the fourth data track, calculates a metric value by multiplying a second weight coefficient, which is a variable whose value changes in accordance with the excess amount, by the excess amount each time the position of the first write head exceeds the second reference radial position, updates a cumulative metric value, which is a cumulative total of the metric values during the write period, and generates second prediction information, which is information predicting whether or not the error correction for the third data track will reach its limit based on the cumulative metric value, before the write processing for all target sectors of the fourth data track is completed, and the determination unit determines whether or not to allow the write processing unit to continue the write processing for the fourth data track based on the second prediction information.

14. The magnetic disk device of claim 13, wherein the first weight coefficient and the second weight coefficient are identical.

15. The magnetic disk device of claim 13, wherein the second weight coefficient is a coefficient that is different from the first weight coefficient.

16. The magnetic disk device of claim 15, further comprising:

a memory unit in which first information indicating a correspondence between the excess amount and the first weight coefficient, and second information indicating a correspondence between the excess amount and the second weight coefficient are recorded, wherein during a write period in which the write processing is executed for the second data track, the correction limit prediction unit derives the first weight coefficient corresponding to the calculated excess amount based on the first information recorded in the memory unit, and during a write period in which the write processing is executed for the fourth data track, the correction limit prediction unit derives the second weight coefficient corresponding to the calculated excess amount based on the second information recorded in the memory unit.

17. The magnetic disk device of claim 1, further comprising:

a second recording layer having a third data track and a fourth data track adjacent to each other in a second recording layer, wherein the third data track and the fourth data track each include a plurality of target sectors to which data is written, and the third data track is located in a second direction parallel to the radial direction when viewed from the fourth data track; and a second write head for writing data to the second recording layer, wherein the second recording layer is formed on an opposite side of the first recording layer in the first disk or is formed in a second disk different from the first disk, the write processing unit is capable of executing write processing to write data to the second recording layer, the error correction unit executes error correction of data in one or more damaged target sectors of the plurality of target sectors of the third data track that are determined to be damaged, and during a write period in which the write processing is executed for the plurality of target sectors of the fourth data track after the write processing is executed for the plurality of target sectors of the third data track, the correction limit prediction unit calculates an excess amount by which a position of the second write head protrudes from a second reference radial position in the second direction each time data is written to each of the target sectors of the fourth data track, calculates a metric value by multiplying a second weight coefficient, which is a variable whose value changes in accordance with the excess amount, by the excess amount each time the position of the second write head exceeds the second reference radial position, updates a cumulative metric value, which is a cumulative total of the metric values during the write period, and generates second prediction information, which is information predicting whether or not the error correction for the third data track will reach its limit based on the cumulative metric value, before the write processing for all target sectors of the fourth data track is completed, and the determination unit determines whether or not to allow the write processing unit to continue the write processing for the fourth data track based on the second prediction information.

18. The magnetic disk device of claim 17, wherein the first weight coefficient and the second weight coefficient are identical.

19. The magnetic disk device of claim 17, wherein the second weight coefficient is a coefficient that is different from the first weight coefficient.

20. The magnetic disk device of claim 1, wherein the write processing unit is capable of selecting a shingled magnetic recording type that overwrites data in the first data track with data in the second data track in a overwrite direction parallel to a radial direction of the first disk.

* * * * *